United States Patent
Hamed

(10) Patent No.: US 12,246,797 B1
(45) Date of Patent: Mar. 11, 2025

(54) FRONT DERAILLEUR WITH INTEGRAL CADENCE SENSOR

(71) Applicant: Hazem Nihad Hamed, Los Angeles, CA (US)

(72) Inventor: Hazem Nihad Hamed, Los Angeles, CA (US)

( * ) Notice: Subject to any disclaimer, the term of this patent is extended or adjusted under 35 U.S.C. 154(b) by 0 days.

(21) Appl. No.: 18/952,984

(22) Filed: Nov. 19, 2024

(51) Int. Cl.
*B62M 9/132* (2010.01)
*B62J 45/20* (2020.01)
*B62J 45/413* (2020.01)
*B62J 45/421* (2020.01)
*B62M 9/133* (2010.01)
*B62M 9/1342* (2010.01)
*B62M 9/136* (2010.01)
*B62M 9/138* (2010.01)

(52) U.S. Cl.
CPC .............. *B62M 9/132* (2013.01); *B62J 45/20* (2020.02); *B62J 45/413* (2020.02); *B62J 45/421* (2020.02); *B62M 9/1342* (2013.01); *B62M 9/136* (2013.01); *B62M 9/138* (2013.01); *B62M 9/133* (2013.01)

(58) Field of Classification Search
CPC ...... B62M 25/08; B62M 9/132; B62M 9/122; B62M 6/50; B62M 9/138; B62M 9/133; B62M 9/1342; B62M 9/136; B62J 45/413; B62J 45/20; B62J 45/421
USPC ...................................................... 474/80, 82
See application file for complete search history.

(56) References Cited

U.S. PATENT DOCUMENTS

| | | | | |
|---|---|---|---|---|
| 5,254,044 A * | 10/1993 | Anderson | .............. | B62M 25/08 474/70 |
| 8,721,495 B2 * | 5/2014 | Kitamura | ............... | B62M 25/08 477/7 |
| 8,888,620 B2 * | 11/2014 | Emura | .................. | B62M 9/135 474/82 |
| 8,979,683 B2 * | 3/2015 | Katsura | ................. | B62M 25/08 474/82 |
| 9,085,340 B1 * | 7/2015 | Sala | ....................... | B62M 9/132 |
| 9,555,857 B2 * | 1/2017 | Kuwayama | ........... | B62M 9/135 |
| 9,573,653 B2 * | 2/2017 | Pasqua | .................... | B62M 9/122 |
| 9,682,744 B2 * | 6/2017 | Watarai | ................... | B62M 25/08 |
| 9,758,217 B2 * | 9/2017 | Bortoli | .................... | B62M 9/132 |
| 9,809,276 B2 * | 11/2017 | Katsura | ................. | B62M 9/132 |
| 9,873,482 B2 * | 1/2018 | Nishino | ................. | B62M 9/135 |
| 10,053,189 B2 * | 8/2018 | Pasqua | .................... | B62M 9/132 |
| 10,640,171 B2 * | 5/2020 | Hamed | ..................... | B62J 50/22 |
| 10,668,983 B2 * | 6/2020 | Bortoli | .................... | B62M 9/124 |
| 10,668,985 B2 * | 6/2020 | Miglioranza | .......... | B62M 9/132 |
| 10,696,358 B2 * | 6/2020 | Bernardele | ............ | B62M 9/132 |
| 10,859,594 B2 * | 12/2020 | Miglioranza | ........... | B62L 1/005 |

(Continued)

*Primary Examiner* — Henry Y Liu

(57) ABSTRACT

A bicycle front derailleur with an integral cadence sensor serving to guard against undesirable actuation of either front or rear derailleur without necessary chain movement being present and additionally making use of a standard wireless remote control (RC) servo drive unit relying exclusively on spur gearing reduction facilitating highly efficient and accurate derailleur positioning thereof through a magnetic rotary encoder with direct sensing of derailleur position and with alignment of derailleur actuation components thereof in the horizontal plane guarding against undesirable transmission of gravitational and vertical inertial forces to wireless remote control (RC) servo drive unit adversely affecting accuracy.

21 Claims, 18 Drawing Sheets

(56) References Cited

U.S. PATENT DOCUMENTS

| | | | | |
|---|---|---|---|---|
| 11,029,225 B1* | 6/2021 | Tachibana | ............. | B62J 45/421 |
| 11,124,269 B2* | 9/2021 | Sterbenz | ................ | B62M 25/08 |
| 11,192,607 B2* | 12/2021 | Fujimoto | ............... | B62M 9/132 |
| 11,554,832 B2* | 1/2023 | Fujimoto | ............... | B62M 9/122 |
| 11,565,772 B2* | 1/2023 | Fujimoto | ............... | B62J 45/413 |
| 11,566,702 B2* | 1/2023 | Chuang | ............... | F16H 61/0213 |
| 11,584,478 B2* | 2/2023 | Shahana | ................ | B62M 9/123 |
| 11,597,470 B2* | 3/2023 | Kondo | ..................... | B62J 45/00 |
| 11,597,471 B2* | 3/2023 | Shahana | ................ | B62J 45/411 |
| 11,618,532 B2* | 4/2023 | Jordan | ................... | B62M 25/08 474/80 |
| 11,787,504 B2* | 10/2023 | Hamed | .................. | B62M 9/122 474/80 |
| 11,794,856 B2* | 10/2023 | Hamed | .................. | B62M 9/134 |
| 11,964,725 B2* | 4/2024 | Hahn | ..................... | B62M 9/122 |
| 12,043,345 B2* | 7/2024 | Fujimoto | ............... | B62M 25/08 |
| 2012/0042725 A1* | 2/2012 | Cote | ..................... | B62M 9/126 73/488 |
| 2012/0322591 A1* | 12/2012 | Kitamura | ............... | B62M 9/122 474/80 |
| 2014/0224039 A1* | 8/2014 | Bjork | ........................ | G01L 3/24 73/862.191 |
| 2016/0152301 A1* | 6/2016 | Bortoli | ................... | B62M 9/132 474/82 |
| 2017/0334518 A1* | 11/2017 | Bortoli | ................... | B62M 9/122 |
| 2018/0001960 A1* | 1/2018 | Pasqua | ................... | B62M 25/08 |
| 2018/0178881 A1* | 6/2018 | Miglioranza | .......... | B62M 9/122 |
| 2018/0180640 A1* | 6/2018 | Miglioranza | .......... | G01P 3/488 |
| 2020/0216144 A1* | 7/2020 | Hamed | .................... | B62K 23/06 |
| 2020/0331556 A1* | 10/2020 | Sterbenz | ................ | B62M 25/08 |
| 2020/0377175 A1* | 12/2020 | Fujimoto | ............... | B62M 9/135 |
| 2021/0199521 A1* | 7/2021 | Tachibana | ............... | G01L 3/108 |
| 2023/0060541 A1* | 3/2023 | Hahn | ..................... | H04W 72/0446 |
| 2023/0086185 A1* | 3/2023 | Fujimoto | ............... | B62M 9/122 474/70 |

* cited by examiner

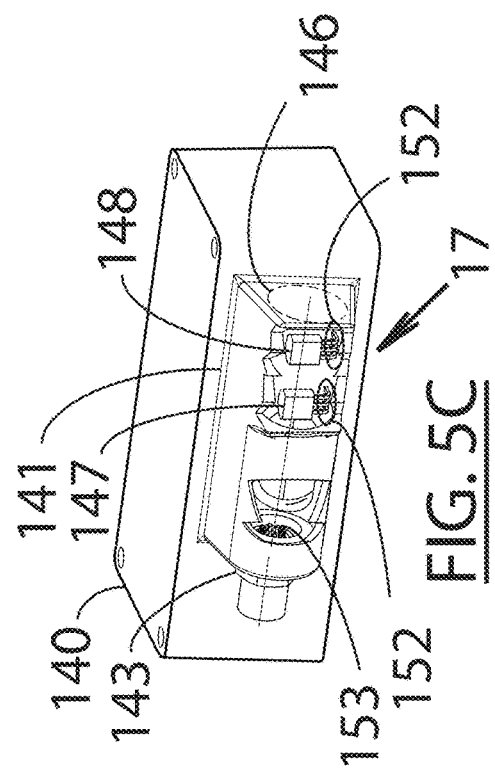
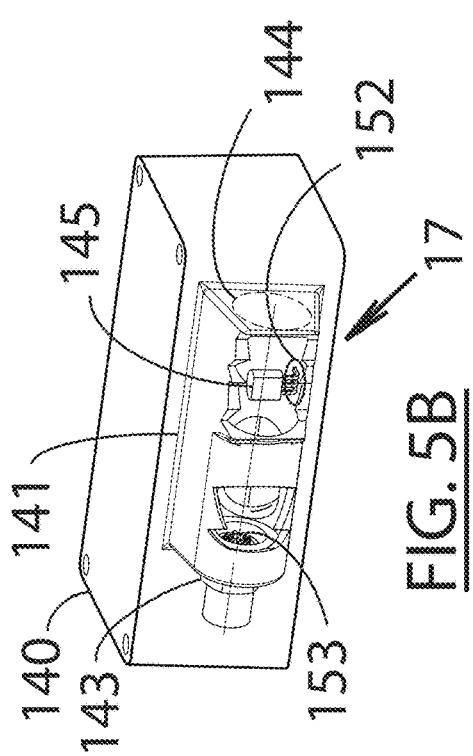
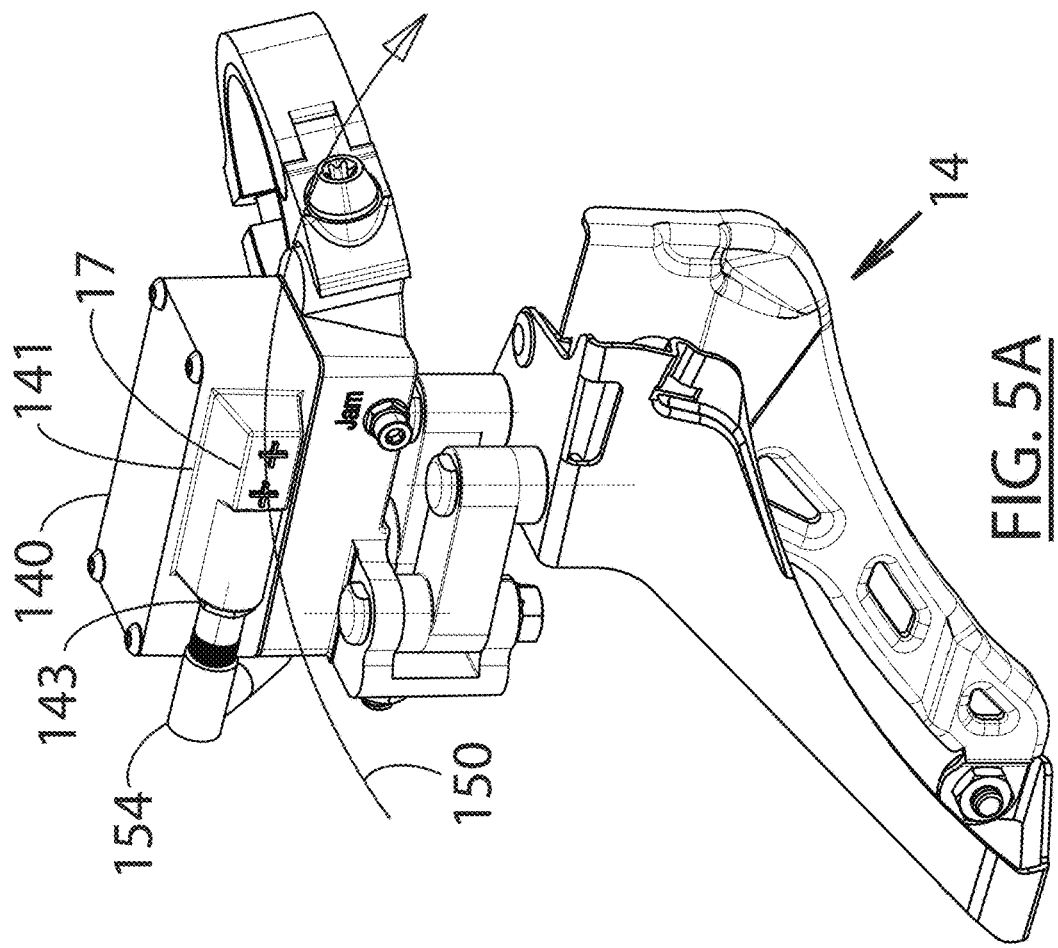

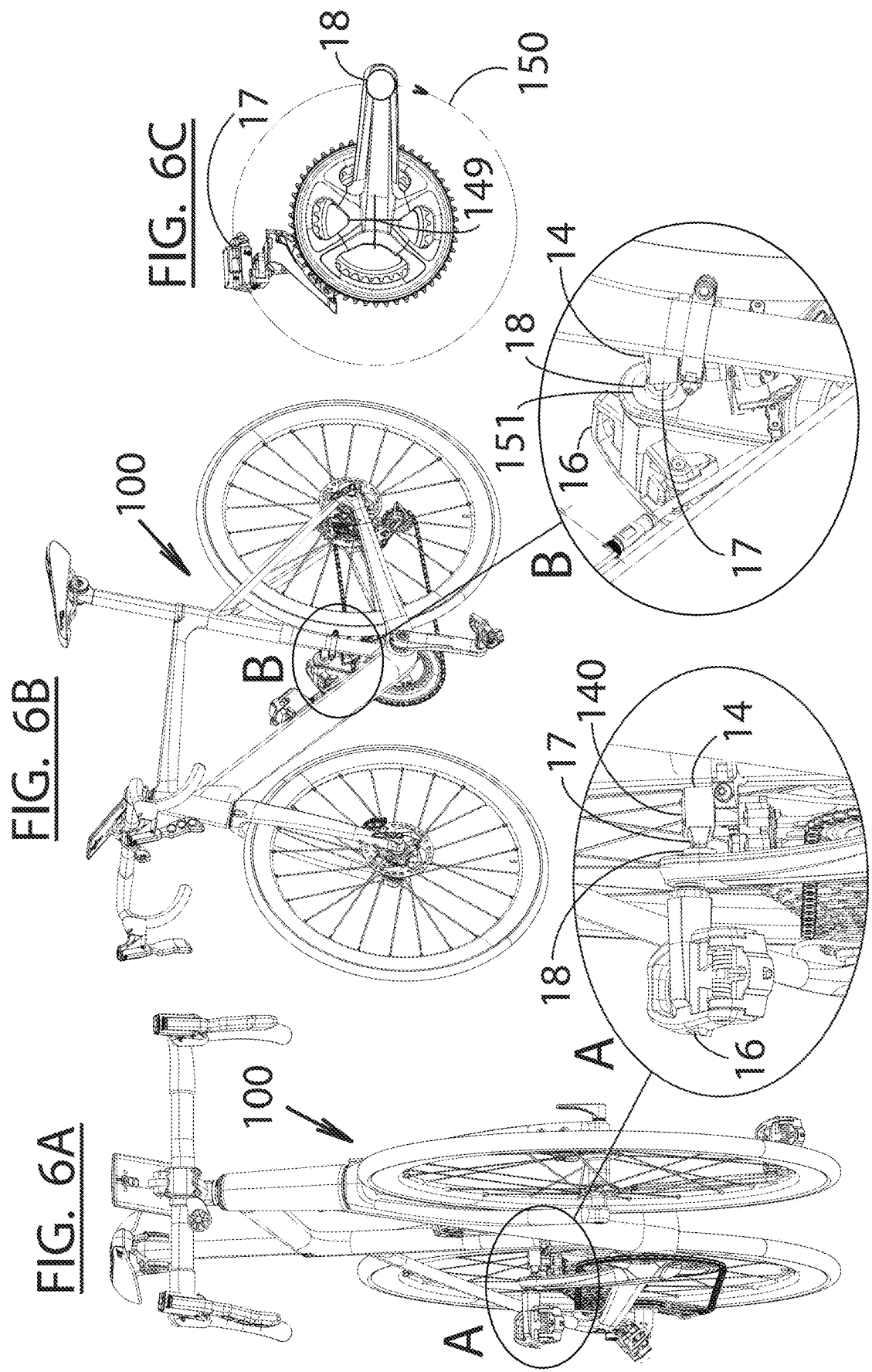

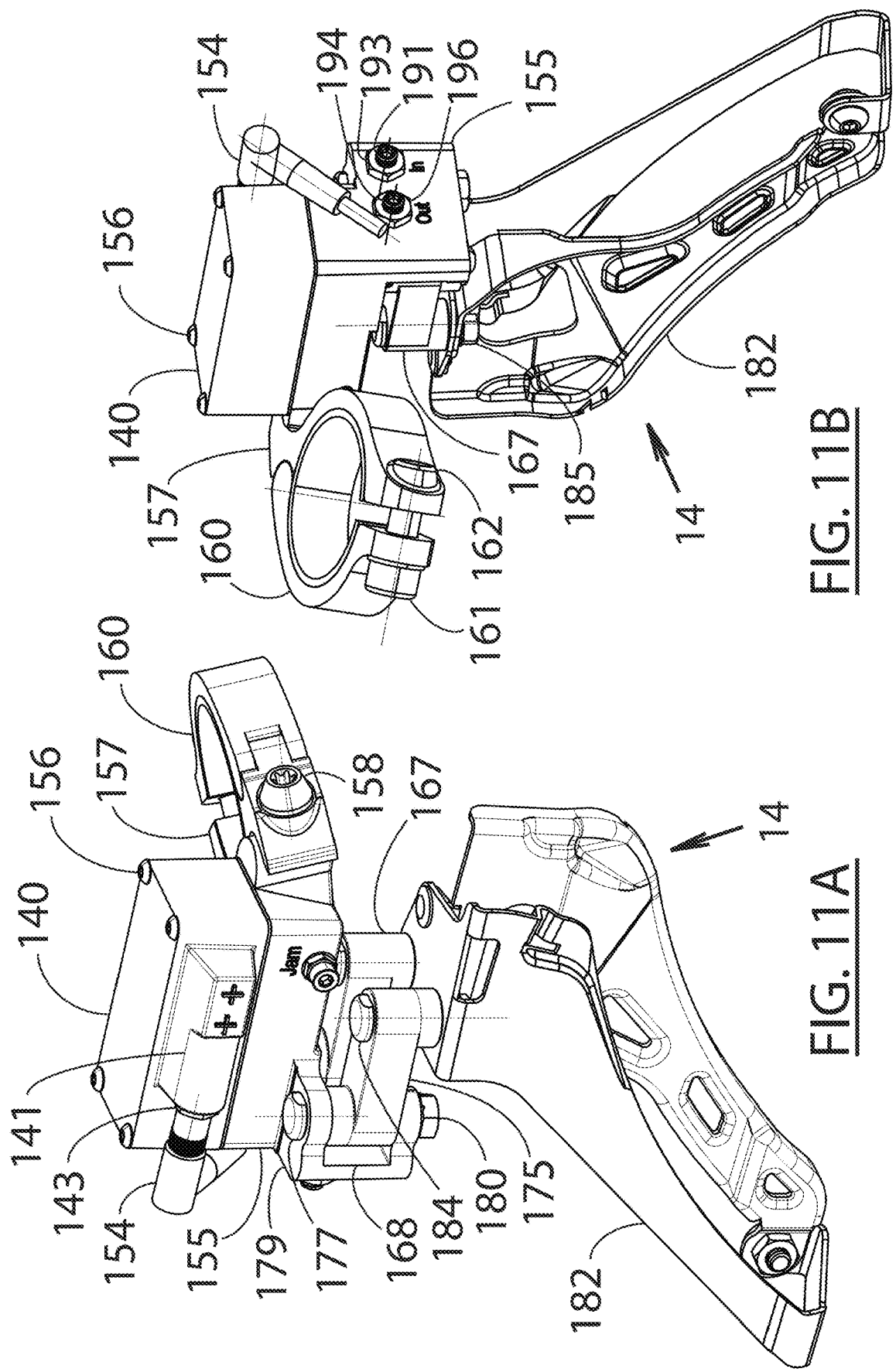

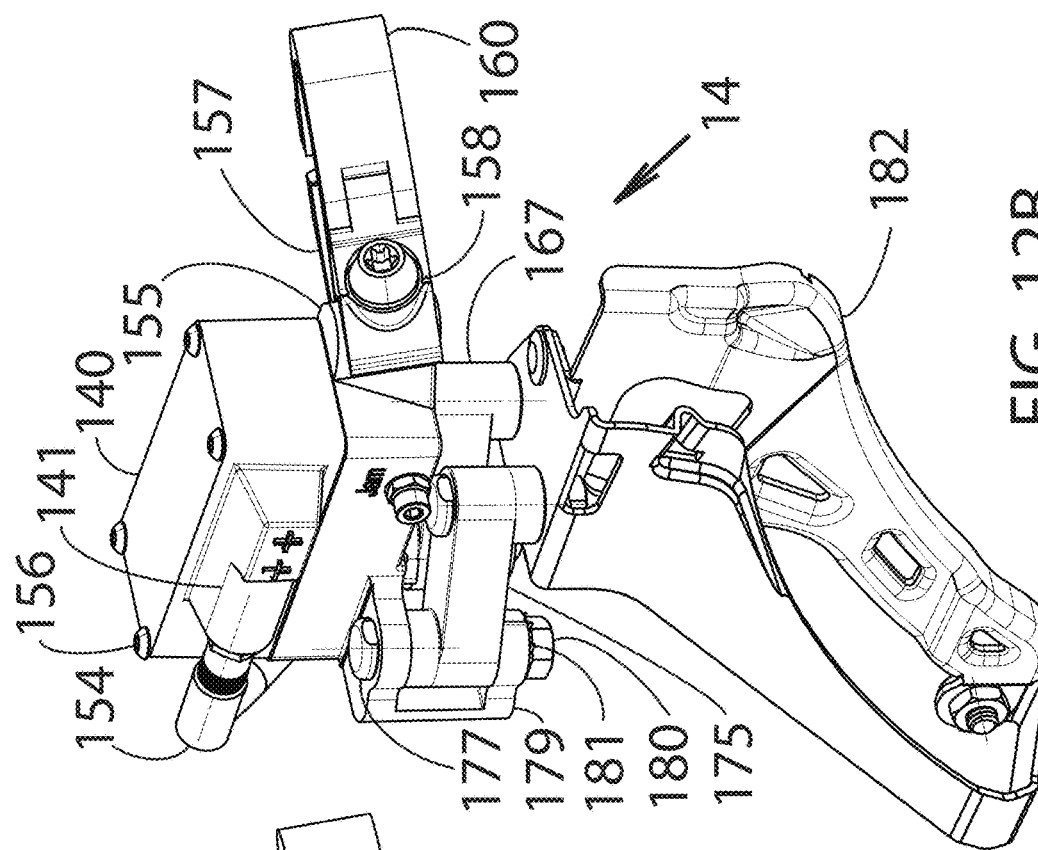
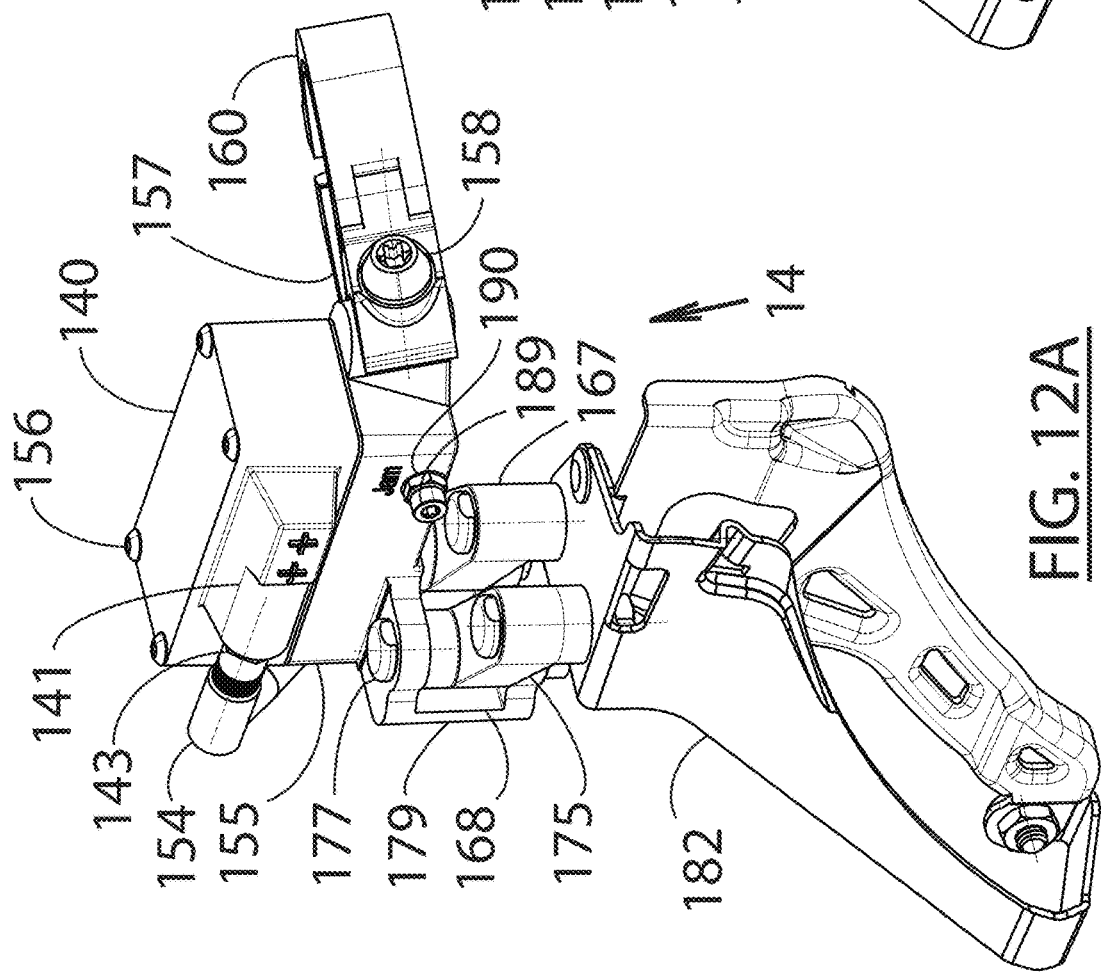

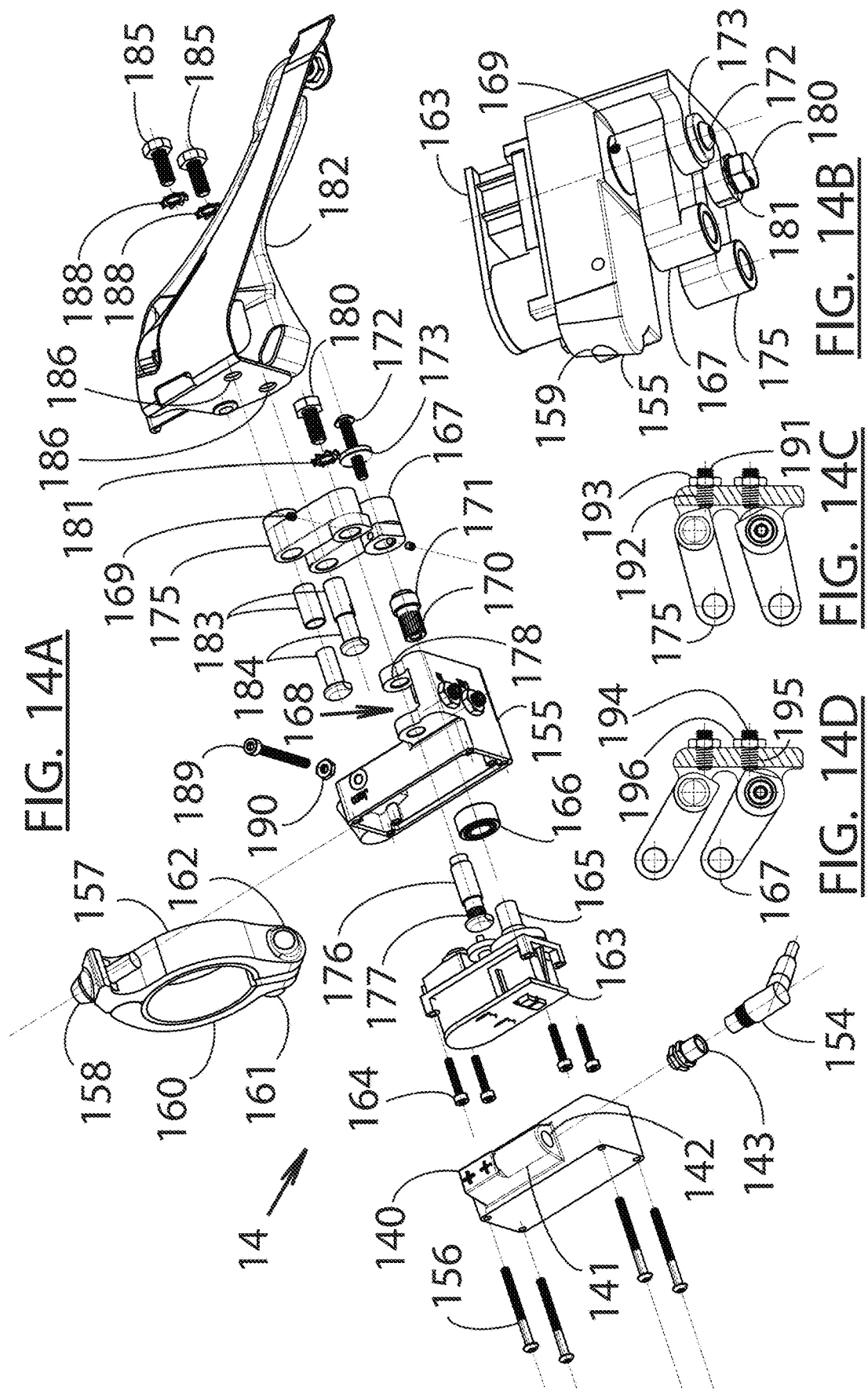

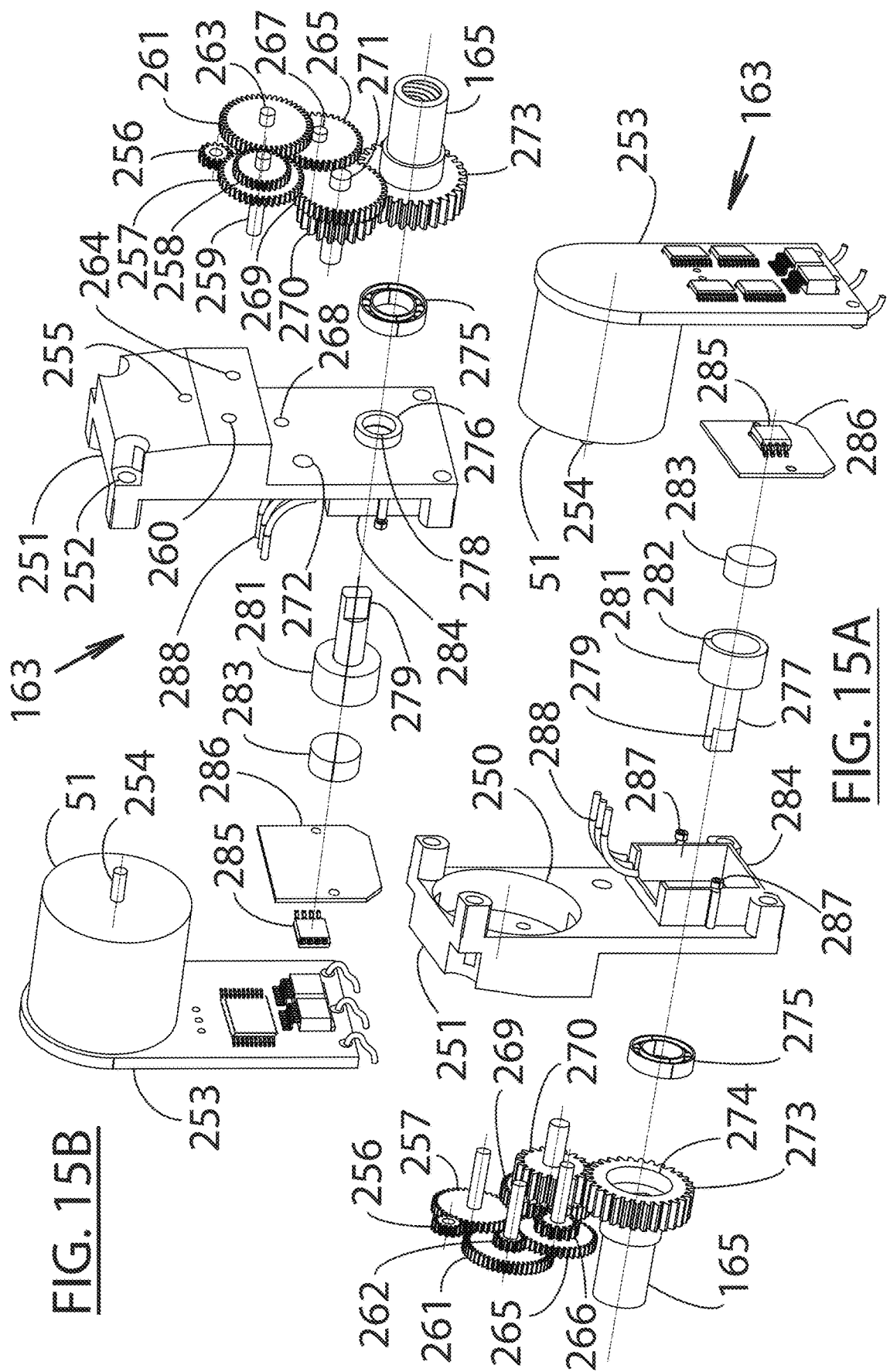

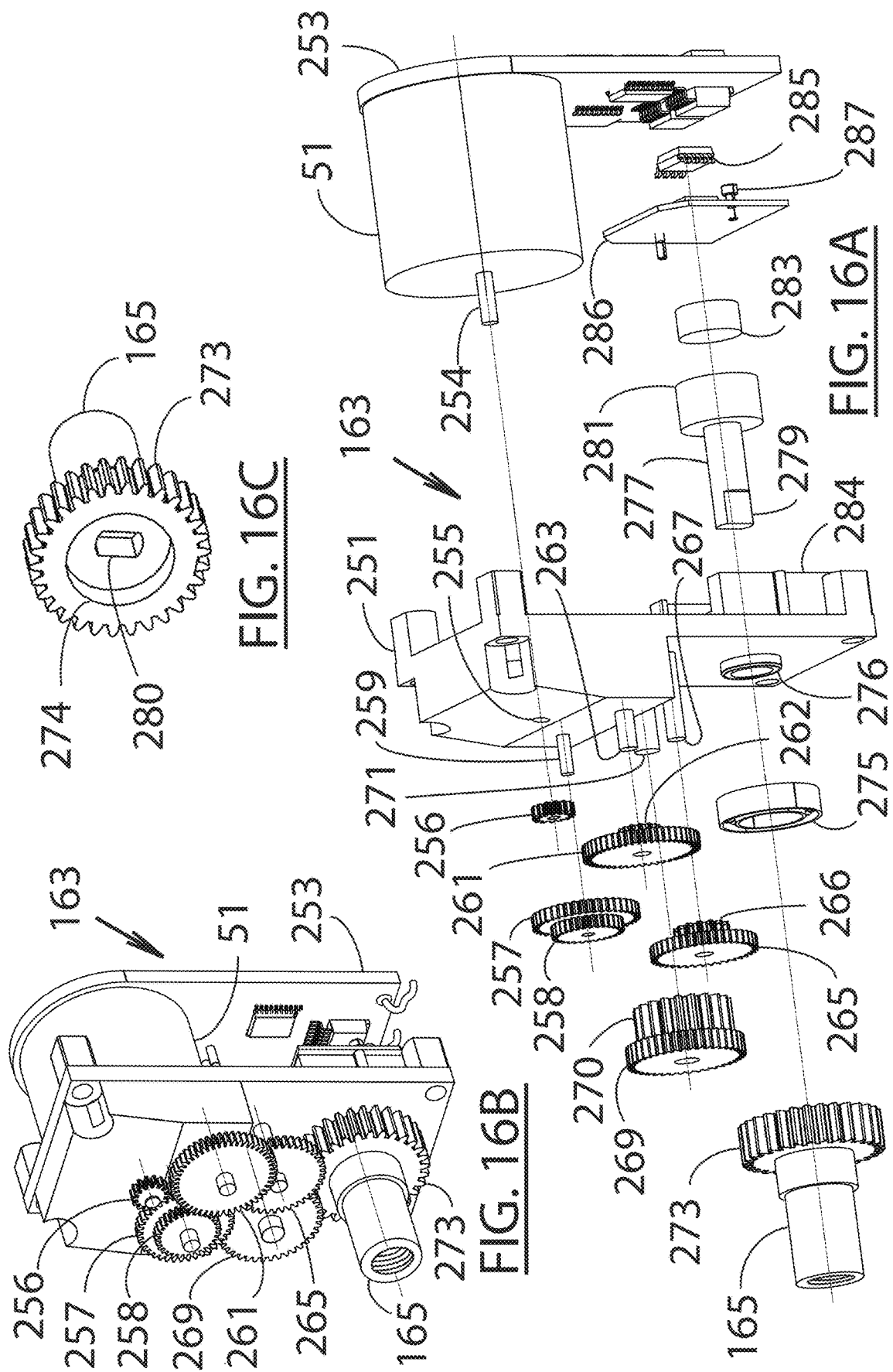

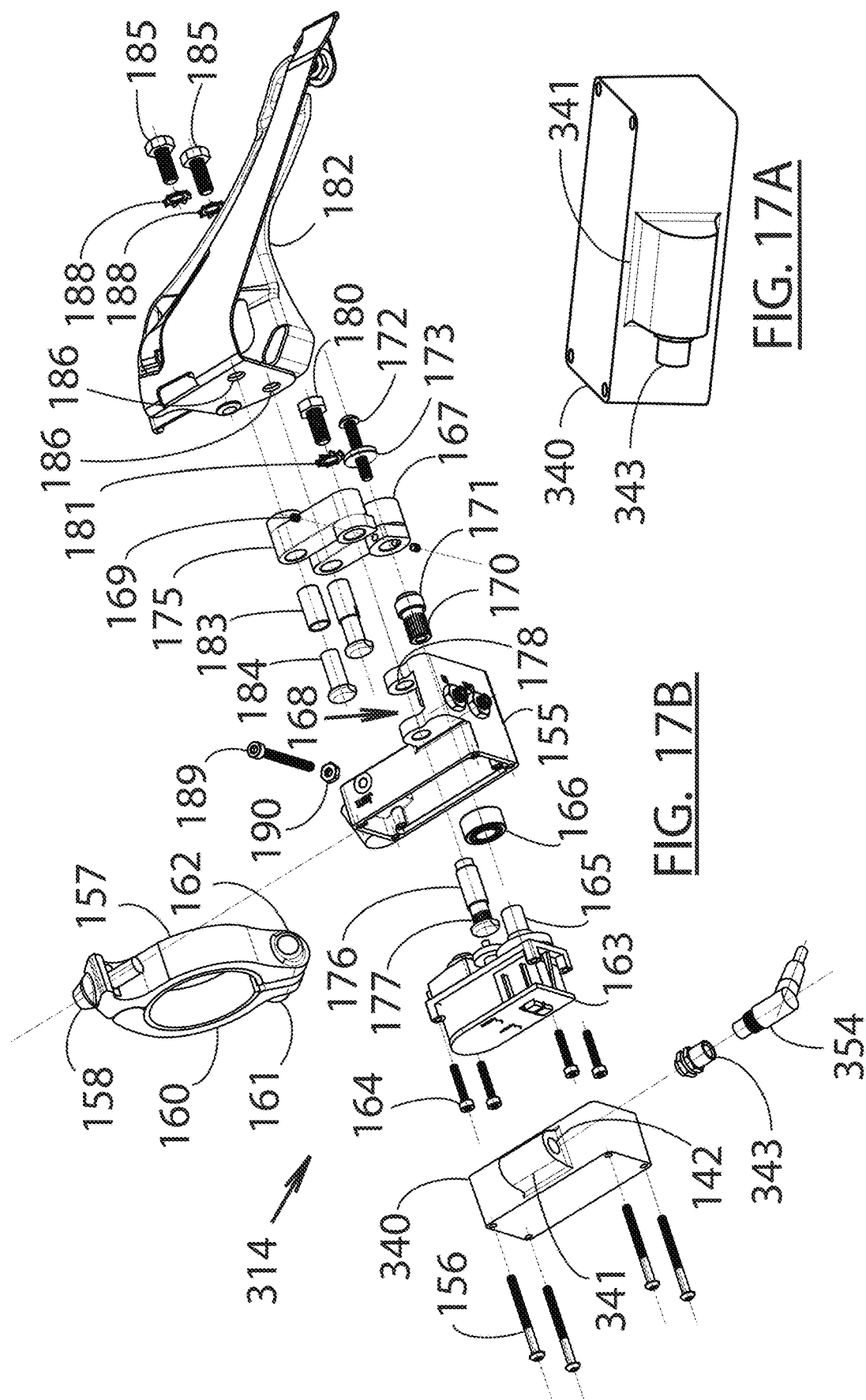

FRONT DERAILLEUR WITH INTEGRAL CADENCE SENSOR

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of front and rear powered drive chain derailleurs serving to alternate drive chain position between different ratio front and rear drive sprockets through wiring to a set of rider control switches, thereby permitting the rider to achieve an optimal drivetrain ratio through selection of an adequate combination of front and rear drive sprockets, thereby facilitating a comfortable pedaling rate and effort thereof depending on desired road speed, rider conditioning, road inclination and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or have to alternate the pedals at an uncomfortably high rate to achieve desired riding speed, a need was recognized for multiple powertrain ratios to facilitate acceptable operator pedaling rates and efforts. A variety of designs consequently emerged where additional power transmission sprockets of various number of teeth but equal pitch were added in the axial directions of the pedals mechanism as well as power transmission rear wheel to facilitate a combination of front and rear power transmission ratios resulting in optimal settings based on desired bicycle speeds, road conditions, operator biometrics and preference. This innovation was facilitated by the de-facto standard four bar linkage mechanism based derailleur assembly used to this very day to alternate drive sprockets through properly positioning the drive chain thereto as well as compensate for resultant varying chain lengths through an integral spring loaded chain tensioning mechanism. The capability was facilitated by two cable tensioning apparatuses, one for rear sprockets and another for the fronts. With one end of each cable apparatus connected to the derailleur chain positioning mechanism and the other end to an operator actuation mechanism typically comprising a lever assembly, this apparatus granted the operator the ability to adjust the chain position in the axial direction for proper alignment and thereby engagement of selected rear and front drive sprockets in order to achieve optimal power transmission ratio settings. Advancements in the actuation mechanism included indexing capability of the operator lever assembly so that the actuation of the gearing mechanism takes place in an indexing fashion consistently properly aligning the chain with desired sprocket thereof rather than one continuous motion requiring the operator to guess the proper chain position often leading to positioning errors.

Most recent developments stemming from desire to eliminate shifting cables altogether and additionally relieve operator actuation efforts through replacement of the shifter mechanisms with switching devices, resulted in a number of powered derailleur designs making use of small DC motors acting through typically a worm and spur gearset to drive the derailleur mechanisms through actuation of one of the joints of their four bar linkages, equally applicable to both rear as well as front derailleurs.

As most of these recent designs need to achieve a substantial gearing reduction ratio to amplify the output torque of their fairly small motors to an operational level, they almost exclusively rely on multiple stage proprietary gearing reduction sets making use of at least one worm gearset stage directly realizing the needed substantial reduction but at the cost of diminished efficiency to around 70% for the wormset stage due to the sliding motion between the worm and the worm gear. With their second, third and often fourth stage relying on pure spur gearing strictly based on rolling motions, these later reduction stages achieve substantially higher power transmission efficiencies, typically in the neighborhood of 95% plus per stage.

Consequentially, the typical efficiency range of electrical derailleur reduction gearsets is in the 60th percentile neighborhood, simply derived by the product of efficiencies of all stages, leading to oversized motors and higher drain on powering circuits and batteries typically leading to premature componentry wear for most of these commercially available derailleurs.

With the highly efficient conventional front and rear derailleur designs requiring chain movement in the forward direction in order to operate, typical attempts to actuate either the front or the rear derailleur while the chain is motionless typically leads to undesirable results where the derailleur is subject to unacceptable stresses. While a leading manufacturer has adopted workarounds to this problem by equipping the rear derailleur with a clutch like releasing mechanism, such a solution, aside from the additional complexity, forces the rider to stop to reset the rear derailleur when this situation arises. While additional endeavor in the art entailed attempts to equip the bicycle derailleur system with a chain movement sensor, implementation could not be achieved without additional components requiring substantial hardware and wiring.

Inventor discloses yet another alternative solution to this problem with implementation thereof straightforward by augmenting the standard front derailleur with a hall effect sensor serving to detect cyclist cadence through detection of motion of a magnet affixed to a nearby location on the bicycle right pedal. With the simplest implementation of either from or rear derailleur actuation taking place on signal change thereof, necessary chain motion for desired shift is thereby assured. Additional endeavor in the art would entail monitoring the hall effect sensor signal to ensure chain motion is taking place, as for example two or three pulses on fixed time intervals, with derailleur actuation thereof taking place immediately upon a cyclist shift command.

The disclosed front derailleur cadence sensor could additionally aid in detection of cycling efforts as well as bicycle speed while cyclist is exercising the bicycle pedals.

DISCUSSION OF PRIOR ART

The following is a brief summary of prior art deemed pertinent to the bicycle front derailleur with integral cadence sensor of the present invention.

U.S. Pat. No. 11,794,856 B2 discloses an electronic front derailleur actuator making exclusive use of high efficiency spur gearing. Notwithstanding the advantages outlined in this disclosure, the outlined artwork depicts action of the moving components in the vertical direction thereby subject to gravitational and vertical inertial forces likely affecting accurate alignment of the chain guiding member.

U.S. Pat. No. 11,458,450 B2 discloses an electronic front derailleur making use of a proprietary geared reduction unit for actuation thereof making use of a first stage worm gearing notwithstanding lower efficiency due to sliding motion between the worm and worm gear leading to higher battery drain, increased motor load and heat generation and thereby shorter componentry life.

U.S. Pat. No. 9,950,769 B2 discloses an assortment of designs for an electronic front derailleur making use of proprietary geared reduction units for actuation thereof, at least one of which making use of a first stage worm gearing set notwithstanding the lower overall efficiency, being the product of efficiencies of all reduction stages, stemming from the worm gearing stage, thereby leading to higher battery drain, increased motor load and heat generation and thereby shorter componentry life.

U.S. Pat. No. 9,573,653 B2 discloses an electronic front derailleur integrating gearing and linkage components. Although this design does offer some potential advantages it does so at the cost of additional weight and costly non-standard and difficult to fabricate components Notwithstanding the extensive endeavor in the art, a standard high efficiency front derailleur making exclusive use of high efficiency spur gearing combined with a gravitational forces immune alternating components through thereof alignment in the horizontal plane remains elusive.

BRIEF SUMMARY OF THE INVENTION

Advantage of spur gearing relying strictly on rolling motion thereby limiting induced frictional losses to the pivot joints and elimination of friction losses arising from gearing sliding action altogether have been known for years. Implementation thereof in front derailleur designs have been recently discovered and outlined in recent disclosures notwithstanding susceptibility to backwinding due to lack of mechanically locked components such as worm gearing in one of the reduction stages. To further reliance on pure spur gearing action in actuation components, and notwithstanding additional resistance to backwinding resulting from reliance on multiple reduction stages, inventor discloses a four bar mechanism based front derailleur design with pivoting members thereof aligned in the horizontal direction thereby relieving actuation gearing of backwinding or reverse actuation forces stemming from gravity and shock in the vertical direction acting on mass of the linkage members as well as the chain alteration cage.

Equally applicable to both front and rear bicycle electrical derailleurs, inventor additional outlines an actuating gearbox apparatus comprising a widely available high efficiency standard reduction transmission package typically used in wireless remote control (RC) servo units thoroughbred for great space and weight savings, exclusively relying on spur gearing and with on-board electronics serving to directly interpret a pulse width modulated signal to power a directly coupled small cored or coreless DC motor acting through a triple, quadruple or quintuple spur gearing reduction set with output shaft thereof coupled to a magnetic 12-bit quadrature encoder for high positioning accuracy. In the foregoing front derailleur implementation, target standard remote control (RC) servo mechanism is directly coupled to actuation shaft of the preferred embodiment front derailleur with thereto affixed actuation link operating in the horizontal direction for elimination of any gravitational and shock forces transmission to the actuation gearing.

A further iteration of the disclosed invention comprises a digitally commutated brushless AC motor, also available as standard off the shelf wireless remote control (RC) servo componentry, in lieu of the brushed DC motor, with integral onboard electronics resulting in greatly improved response time, greater endurance due to elimination of motor brushes and higher efficiency thereof for substantially improved power conservation and minimal heat losses.

In a first control scheme, a rider makes use of a touchscreen based device such as a cellphone to wirelessly monitor using Bluetooth low energy (BLE) status of front and rear derailleur actuation switches, bicycle speed sensor and wind load sensor, and additionally monitor through a Bluetooth wireless connection road inclination, vertical and forward bicycle acceleration as relayed by a shifter control unit directly wired to front derailleur, rear derailleur, chain movement sensor and a newly disclosed seat force sensor, compiles all received inputs through an application program (APP) running on the touchscreen based device, and finally commands Bluetooth wireless shifter control unit to conduct resultant shifting actions based on manual and pre-programmed operator invoked semi-automatic and fully automatic control modes.

In a second and third control schemes, a rider makes use of a touchscreen based device such as a cellphone to wirelessly monitor using Bluetooth low energy (BLE) status of front and rear derailleur actuation switches, bicycle speed sensor, wind load sensor, road inclination sensor, vertical and forward bicycle acceleration sensors, and a seat force sensor, compiles all received inputs through an application program (APP) running on the touchscreen based device, and finally commands through a Bluetooth wireless connection for the second scheme and a remote control (RC) servo wireless communication for the third scheme, wireless front and rear derailleurs to conduct resultant shifting actions based on manual and pre-programmed operator invoked semi-automatic and fully automatic control modes.

A further iteration of the proposed improved front derailleur designs additionally aiming to guard against inadvertent actuation of either the front or rear derailleurs while chain motion is not present which invariably leads to undesirable stresses on either derailleur entails augmentation of the front derailleur with a single or multiple hall effect sensors serving to detect cycling action necessitating chain movement through detection of motion of a magnet affixed to a nearby location on the bicycle right pedal and in turn communication of pedaling motion to derailleur electronic controls so that actuation command to either derailleur is contingent upon necessary chain motion being present.

BRIEF DESCRIPTION OF THE DRAWINGS

FIG. 5A is a dimetric frontal view of the preferred embodiment of the front derailleur with integral cadence sensor of the present invention further depicting path of cadence sensor magnet affixed to pedals assembly.

FIG. 5B is a dimetric frontal view of derailleur housing cover depicting arrangement making use of one hall effect sensor of the preferred and alternate embodiments of the front derailleur with integral cadence sensor of the present invention FIG. 5C is a dimetric frontal view of derailleur housing cover depicting arrangement making use of two hall effect sensors of the preferred and alternate embodiments of the front derailleur with integral cadence sensor of the present invention.

FIG. 6A is a frontal perspective view of a bicycle making use of one the cadence sensing apparatus of the preferred and alternate embodiments of the front derailleur with integral cadence sensor of the present invention with a zoomed view of cadence sensor arrangement.

FIG. 6B is a side perspective view of a bicycle making use of one the cadence sensing apparatus of the preferred and alternate embodiments of the front derailleur with integral cadence sensor of the present invention with a zoomed view of cadence sensor arrangement.

FIG. 6C is a side view of trajectory of the cadence sensor magnet resulting from affixation to the pedals assembly along with the preferred and alternate embodiments of the front derailleur with integral cadence sensor of the present invention.

FIG. 11A is a dimetric frontal view of the preferred embodiment of the front derailleur with integral cadence sensor of the present invention.

FIG. 11B is a dimetric rearward view of the preferred embodiment of the front derailleur with integral cadence sensor of the present invention.

FIG. 12A is a dimetric view of the preferred embodiment of the front derailleur with integral cadence sensor of the present invention in the extended position.

FIG. 12B is a dimetric view of the preferred embodiment of the front derailleur with integral cadence sensor of the present invention in the retracted position.

FIG. 14A is an exploded top view of the preferred embodiment of the front derailleur with integral cadence sensor of the present invention.

FIG. 14B is a partial perspective view of the actuation assembly of the preferred embodiment of the front derailleur with integral cadence sensor of the present invention.

FIG. 14C is sectional view of the actuation retraction adjustment stop of the preferred embodiment of the front derailleur with integral cadence sensor of the present invention.

FIG. 14D is sectional view of the actuation extension adjustment stop of the preferred embodiment of the front derailleur with integral cadence sensor of the present invention.

FIG. 15A is an exploded rearward view of the wireless remote control (RC) servo drive unit made use of by the preferred and alternate embodiments of the front derailleur with integral cadence sensor of the present invention further depicting a rearward view of the gearing assembly.

FIG. 15B is an exploded frontal view of the wireless remote control (RC) servo drive unit made use of by the preferred and alternate embodiments of the front derailleur with integral cadence sensor of the present invention further depicting a frontal view of the gearing assembly.

FIG. 16A is an exploded dimetric view of the wireless remote control (RC) servo drive unit made use of by the preferred and alternate embodiments of the front derailleur with integral cadence sensor of the present invention with a further explosion of the gearing components.

FIG. 16B is a dimetric assembly view of the wireless remote control (RC) servo drive unit made use of by the preferred and alternate embodiments of the front derailleur with integral cadence sensor of the present invention.

FIG. 16C is a dimetric view of back of the output shaft of the wireless remote control (RC) servo drive unit made use of by the preferred and alternate embodiments of the front derailleur with integral cadence sensor of the present invention.

FIG. 17A is a dimetric frontal view of the derailleur housing cover of the third alternate embodiment of the front derailleur with integral cadence sensor of the present invention entailing removal of all cadence sensing components and provisions.

FIG. 17B is an exploded top view of the third alternate embodiment of the front derailleur with integral cadence sensor of the present invention with all cadence sensing components and provisions removed.

DETAILED DESCRIPTION OF THE INVENTION

Figure 1:
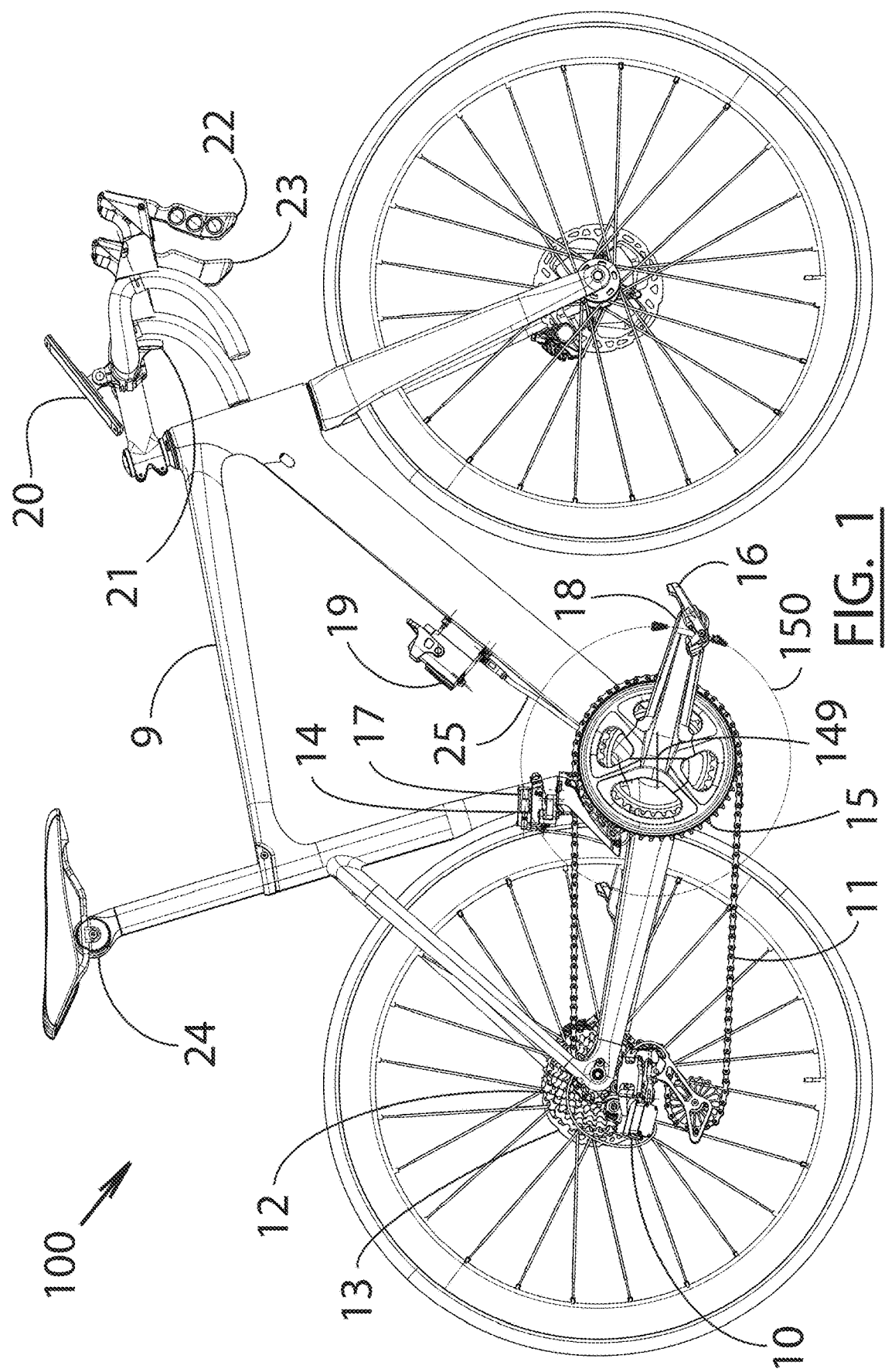
FIG. 1 is an overall view of the mechanical and electrical components of a bicycle making use of the preferred embodiment of the front derailleur with integral cadence sensor of the present invention.
Figure 2:
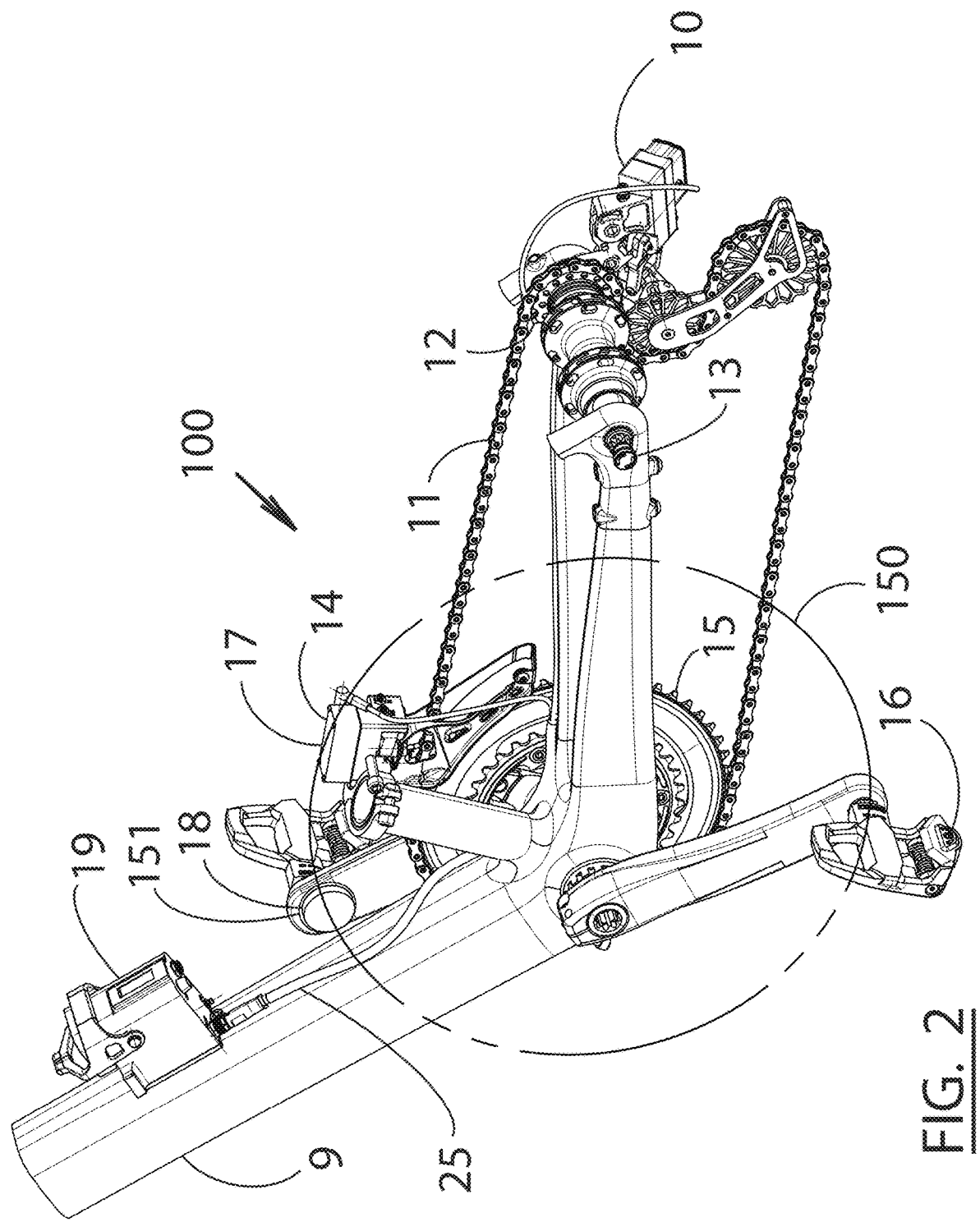
FIG. 2 is a perspective view of the powertrain of a bicycle making use of the preferred embodiment of the front derailleur with integral cadence sensor of the present invention.
Figure 3:
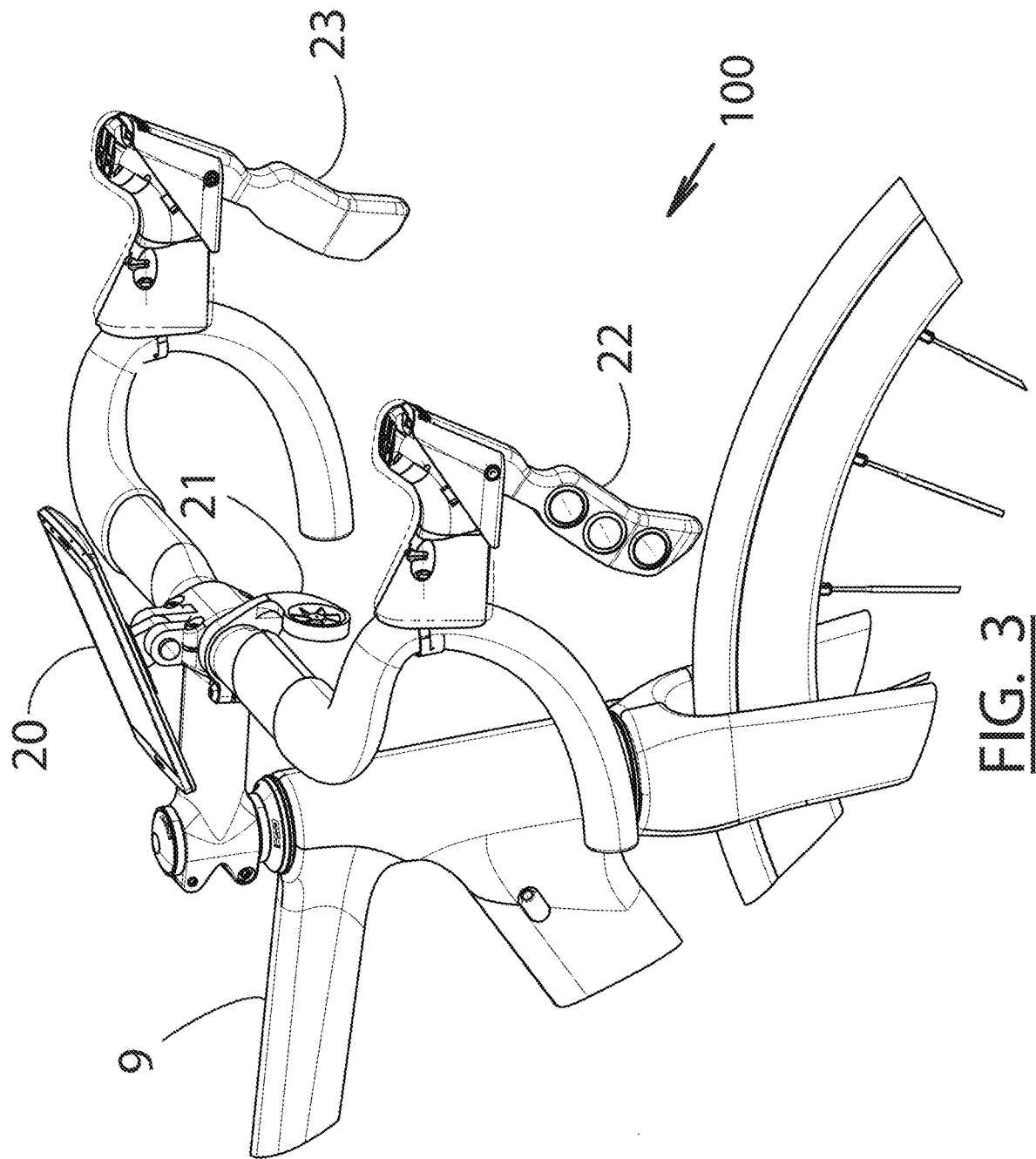
FIG. 3 is a perspective view of the control panel, vane anemometer and derailleur shifters of a bicycle making use of the preferred embodiment of the front derailleur with integral cadence sensor of the present invention.

Preferred Embodiment Construction—FIGS. 1-4.

With reference to FIGS. 1-4, the preferred embodiment 100 of a bicycle making use of the preferred embodiment of the front derailleur with integral cadence sensor of the present invention comprises bicycle frame 9, rear derailleur 10 serving to alternate chain 11 between sprockets 12 of rear drive hub assembly 13, front derailleur 14 serving to alternate chain 11 between chain rings 15 rotationally affixed to front pedals assembly 16, front derailleur integral hall effect sensor 17, right pedal mounted magnet 18, controller 19, control panel 20, vane anemometer 21, rear shifter switches 22, front shifter switches 23, and seat force sensor 24. Partially shown wiring harness 25 serves to interconnect controller 19 to rear derailleur 10 and front derailleur 14.

Figure 4:
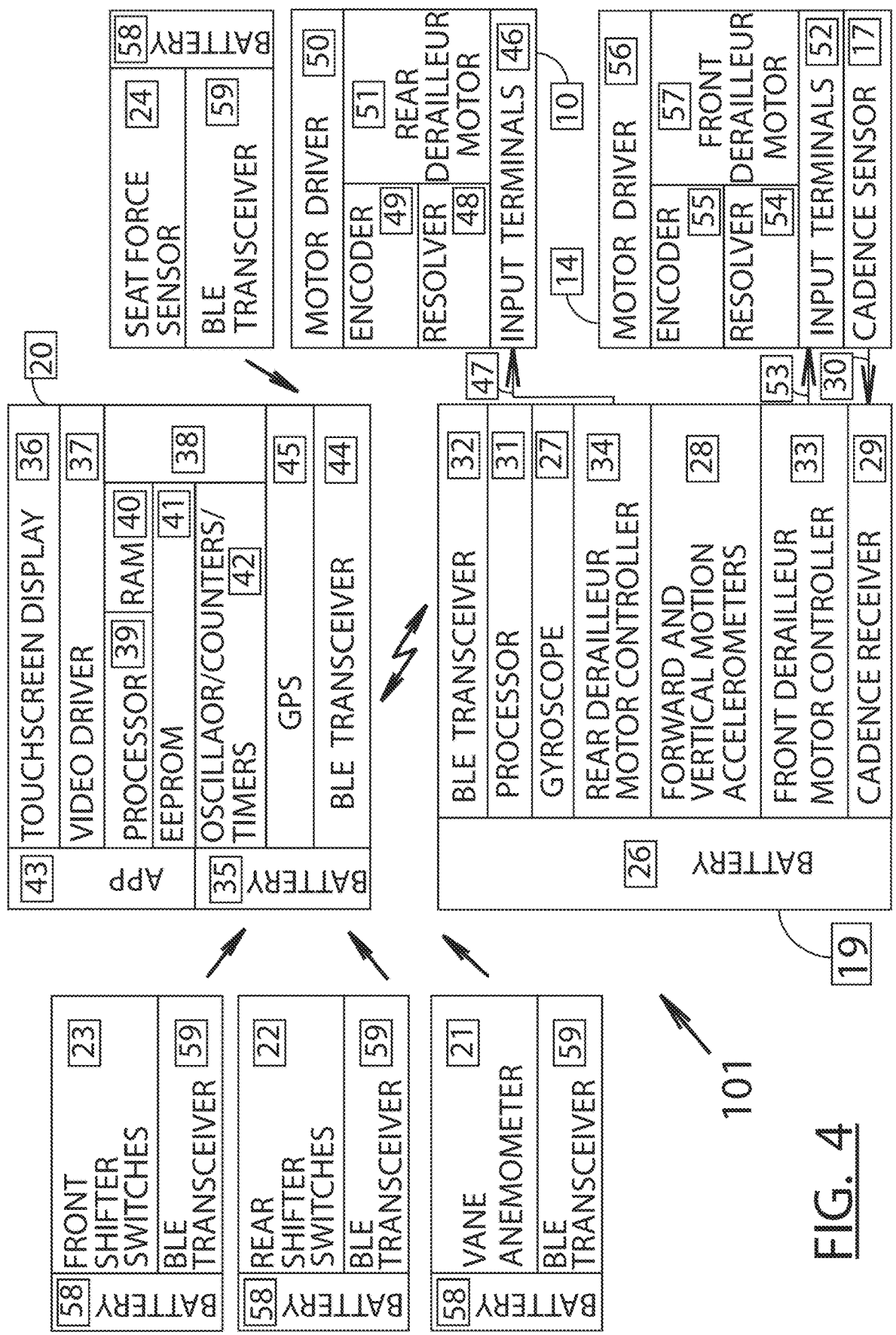
FIG. 4 is a block diagram of a comprehensive control system for a bicycle making use of the preferred embodiment of the front derailleur with integral cadence sensor of the present invention.

Preferred Embodiment Controls—FIG. 4.

With reference to FIG. 4, the preferred embodiment 100 of a bicycle making use of the preferred embodiment front derailleur with integral cadence sensor of the present invention makes use of controls block diagram 101 comprising the following subsystems.

Controller 19 comprising steady power supply rechargeable battery pack 26, gyroscope 27, forward and vertical motion accelerometers 28, cadence receiver 29 serving to receive signal 30 of front derailleur cadence sensor 17, and processor 31 serving to relay status of cadence receiver 29, forward and vertical motion accelerometers 28, and gyroscope 27 to control panel 20 through BLE transceiver 32 and receive feedback and operator commands thereof in order to execute actuation commands to front derailleur motor controller 33 and rear derailleur motor controller 34.

Control panel 20 comprising battery 35, touchscreen display 36, video driver 37, controls subsection 38 consisting of processor 39, random access memory (RAM) 40, electrically erasable programmable read only memory (EE-PROM) 41, oscillator/counters/timers subsection 42, acting as an integral system executing application program (APP) 43 serving to evaluate readings of cadence sensor 17, vane anemometer 21, seat force sensor 24, forward and vertical motion accelerometers 28, and gyroscope 27, all received through BLE transceiver 44 as well as commands from rear shifter switches 22, front shifter switches 23, and in turn issue controls command to controller 19 for programmed energization of front derailleur motor controller 33 and rear derailleur motor controller 34 through Bluetooth transceiver 44, global positioning system (GPS) 45, integral to control panel 20 serving to display rider location on touchscreen display 36 to support rider road and trail navigation as well as relay projected road topography for inclination evaluation by (APP) 43.

Motor controls subsection of rear derailleur 10 comprises input terminals 46 serving to receive power and control signal 47 from rear derailleur motor controller 34 of controller 19, comparator/resolver 48 serving to compare signal from rear derailleur encoder 49 to received control signal 47 thereof, and accordingly bias motor driver 50 serving to power motor 51 of rear derailleur 10.

Motor controls subsection of front derailleur 14 comprises input terminals 52 serving to receive power and control signal 53 from front derailleur motor controller 33 of controller 19, comparator/resolver 54 serving to compare signal from front derailleur encoder 55 thereof, to received control signal 53 and accordingly bias motor driver 56 serving to power motor 51 of front derailleur 14, and again, cadence sensor 17 serving to relay cyclist pedaling motion signal 30 to cadence receiver 29 of controller 19.

Operating as individually powered standard Bluetooth Low Energy (BLE) spectrum protocol discrete transmission units, front shifter switches 23, rear shifter switches 22 vane anemometer 21, and seat force sensor 24, each comprising own battery 58 for power and own Bluetooth Low Energy (BLE) transceiver 59 for wireless communication, serve to respectively transmit operator commands, wind speed, and operator pedaling force with data thereof, in turn, intercepted by BLE transceiver 44 for data processing through (APP) 43 of control panel 20.

Cadence Sensor Construction—FIGS. 1, 2, 5A-5C, 6A-6C.

With reference to FIGS. 1, 2, 5A-5C, 6A-6C, the preferred embodiment 14 of the front derailleur with integral cadence sensor of the present invention comprises front derailleur cover 140 with sideward extension 141 including bore 142 machined into trailing end thereof and tapped for receipt of receptacle 143, and with leading end including bore 144 where hall effect sensor 145 is potted into proper position as shown in FIG. 5B or alternately including bore 146 where trailing hall effect sensor 147 and leading hall effect sensor 148 are potted into proper positions thereof and in proper relation to each other as shown in FIG. 5C with either configuration serving to detect presence of a magnetic flux in their vicinity, magnet 18 with mounting thereof as depicted in FIGS. 6A and 6B to inside of right pedal arm at a radial distance from pedaling axis 149 equivalent to that of location of the cadence sensing apparatus of front derailleur 14 in order to follow pedaling motion thereof as depicted by circular sweep trajectory 150 in FIGS. 1, 5A & 6C and at a proper distance of a few millimeters from derailleur 14 in the axial direction as controlled by thickness of spacer 151 thereby ensuring magnetic flux thereof excites hall effect sensors 145 or 147 and 148 depending on implementation thereof depicted in either FIG. 5B or FIG. 5C, and with terminals 152 of hall effect sensors wired to respective contacts 153 of receptacle 143 with connection thereof serving to provide power and relay signal 30 of hall effect sensor 145, or sensors 147 and 148 to controller 19 through connector 154 through wiring harness 25.

Cadence Sensor Operation—FIGS. 1, 2, 5A-5C, 6A-6C.

With reference to FIGS. 1, 2, 5A-5C, 6A-6C again, operation of the cadence sensing apparatus of the preferred embodiment front derailleur with integral cadence sensor 14 of the present invention entails monitoring of excitation signals of hall effect sensors 145, 147 and 148, depending on implementation thereof, as magnet 18 sweeps past their respective positions upon a cyclist operating the bicycle pedals. In the simplest form sensing of pedaling motion notwithstanding direction is shown in FIG. 5B with thereof implementation comprising only one hall effect sensor thereby producing the same pulsating signal whether the pedaling motion takes place in the clockwise direction as required for derailleur operation or conversely in the counterclockwise as always possible but typically producing no useful effects or forcing chain motion thereof. Notwithstanding that a cyclist should be typically aware of the pedaling direction or pedaling motion altogether prior to commanding actuation of either rear derailleur 10 or front derailleur 14, past experience of some derailleur manufacturers has proven otherwise and therefore a more robust although a bit more complex implementation not relying on the awareness of the cyclist comprises two hall effect sensors with the controls additionally examining the pedaling direction by sensing the order of the pulse signals with a leading signal from hall effect sensor 147 indicating that the pedaling motion is taking place in the clockwise direction and with the vice-versa sensor 148 leading indicating that the pedaling motion is taking place in the counterclockwise and thereby useless direction leading to cyclist command thereof being simply ignored by controller 19 in order to avoid undue stress to either of the bicycle derailleurs. With the simplest implementation of either front or rear derailleur actuation taking place on signal change thereof, necessary chain motion for desired shift is thereby assured notwithstanding momentary delay in producing the needed shift until the pedals sweep magnet 18 into the proximity of the cadence sensing apparatus. Additional endeavor in the art would entail monitoring the hall effect sensor signal to ensure chain motion is taking place, as for example two or three pulses on fixed or near fixed time intervals, with derailleur actuation thereof taking place immediately upon a cyclist shift command.

Figure 7:
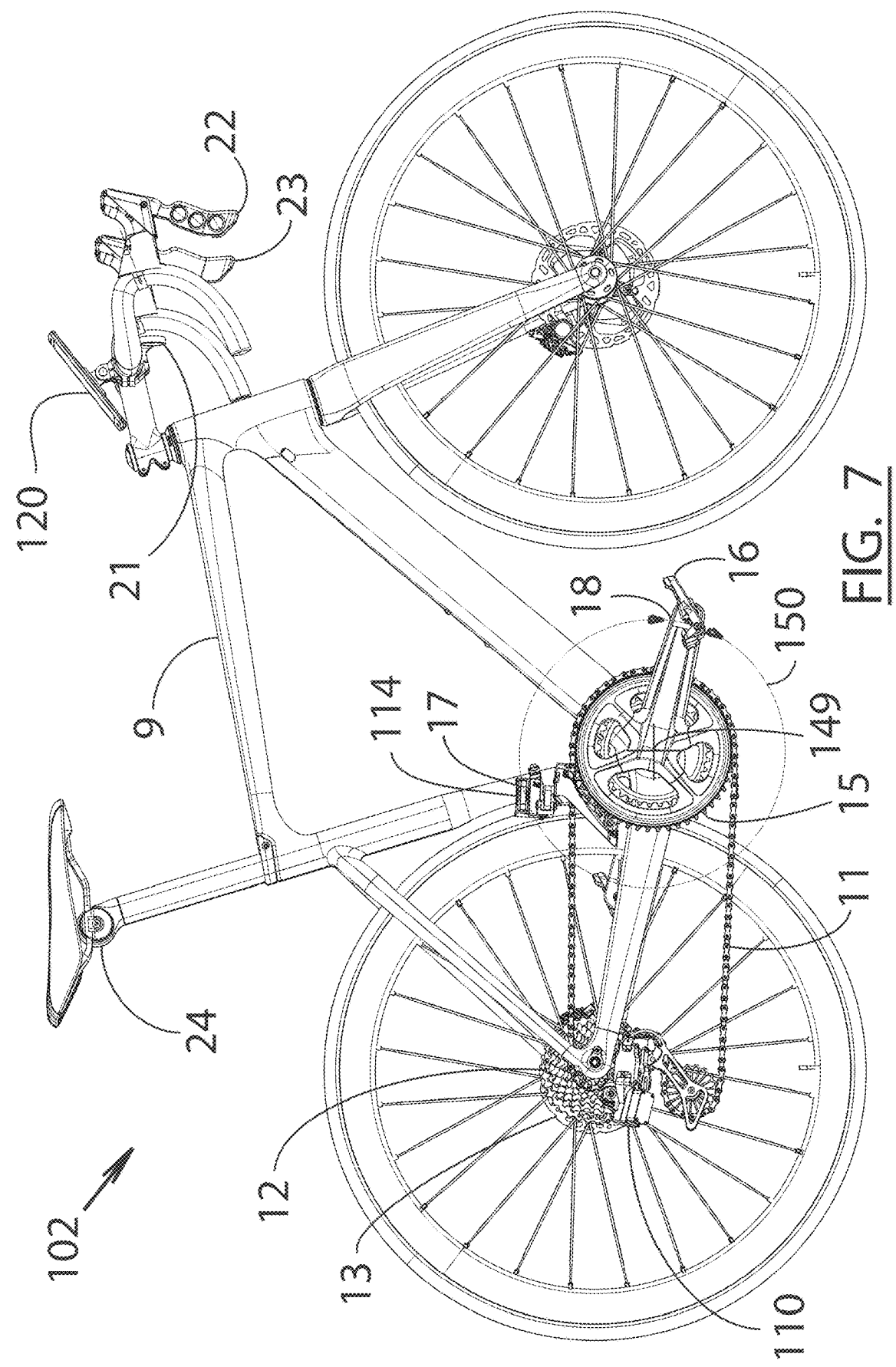
FIG. 7 is an overall view of the mechanical and electrical components of a bicycle making use of the first alternate embodiment of the front derailleur with integral cadence sensor of the present invention.
Figure 8:
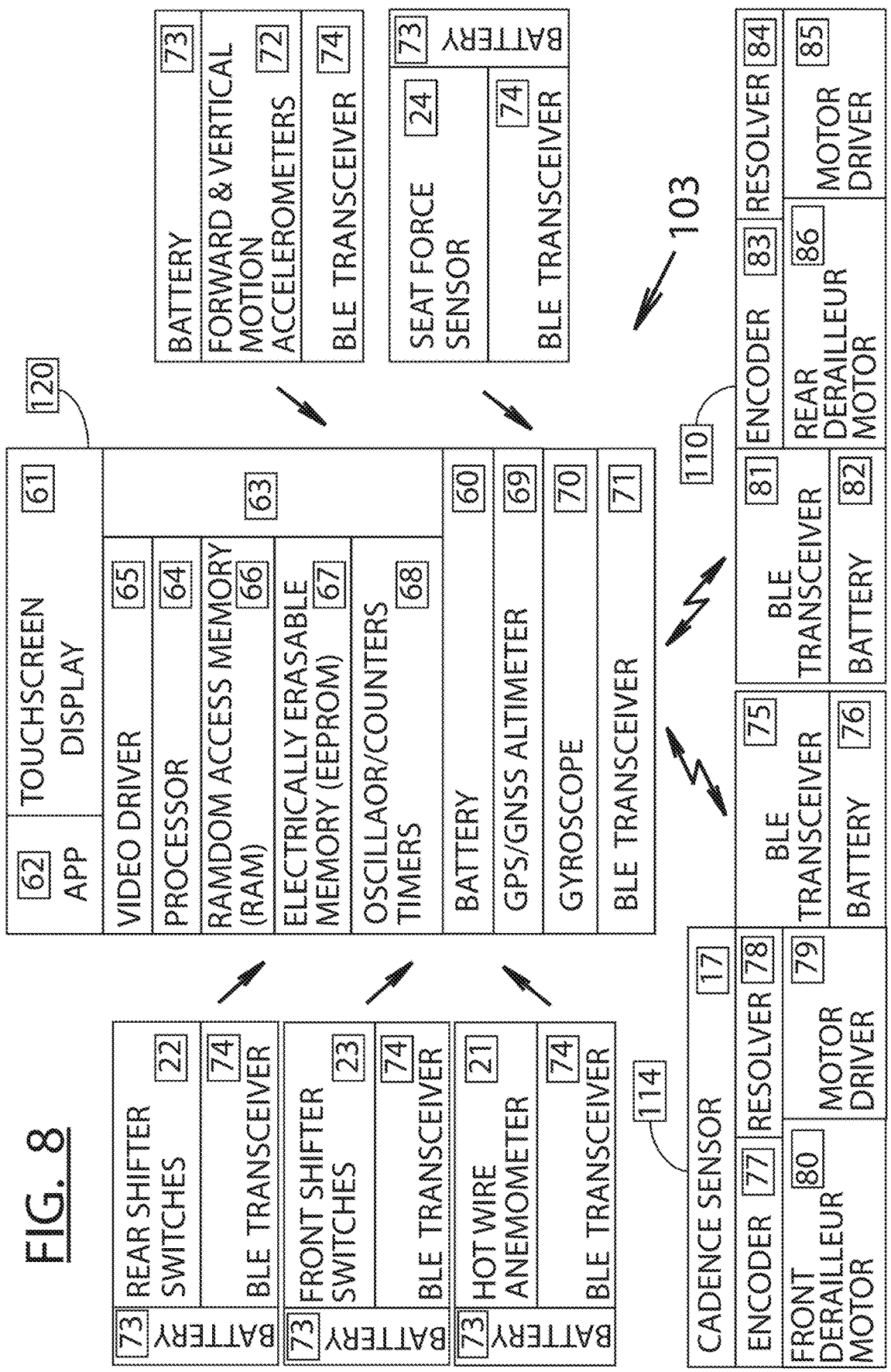
FIG. 8 is a block diagram of a comprehensive control system for a bicycle making use of the first alternate embodiment of the front derailleur with integral cadence sensor of the present invention.

First Alternate Embodiment Construction—FIGS. 7 & 8.

With reference to FIGS. 7 & 8, the first alternate embodiment 102 of a bicycle making use of the first alternate embodiment front derailleur with integral cadence sensor of the present invention comprises bicycle frame 9, rear derailleur 110 serving to alternate chain 11 between sprockets 12 of rear drive hub assembly 13, front derailleur 114 serving to alternate chain 11 between chain rings 15 rotationally affixed to front pedals assembly 16, control panel 120, vane anemometer 21, rear shifter switches 22, front shifter switches 23, seat force sensor 24 and integral cadence sensor 17 of front derailleur 114 serving to sense proximity of magnet 18 attached to inside of right arm of right pedal 16 with exact same mounting thereof as in the preferred embodiment of the front derailleur with integral cadence sensor 14.

First Alternate Embodiment Controls—FIGS. 7 & 8.

With reference to FIGS. 7 & 8 again, the first alternate embodiment 102 of a bicycle making use of the first alternate embodiment of the front derailleur with integral cadence sensor of the present invention makes use of controls block diagram 103 comprising the following subsystems.

Control panel 120 acting as a central wireless system controller powered by battery 60, displaying system status and receiving operator commands through touchscreen display 61 based on application program (APP) 62 executing on microcontroller subsection 63 including processor 64, video driver 65, random access memory (RAM) 66, electrically erasable programmable read only memory (EEPROM) 67, oscillator/counters/timers subsection 68, based on signals received from integral GPS/GNSS altimeter 69, gyroscope 70 and through Bluetooth Low Energy (BLE) transceiver 71 wireless signals received from front shifter switches 23, rear shifter switches 22, vane anemometer 21, seat force sensor 24, cadence sensor 17 of front derailleur 114 and forward and vertical motion accelerometers 72, serves to wirelessly command each of battery powered front derailleur 114 and battery powered rear derailleur 110 through Bluetooth Low Energy (BLE) transceiver 71.

Operating as individually powered standard Bluetooth Low Energy (BLE) spectrum protocol discrete transmission units, seat force sensor 24, front shifter switches 23, rear shifter switches 22, vane anemometer 21, and forward and vertical motion accelerometers 72, each comprising own battery 73 for power and own Bluetooth Low Energy (BLE) transceiver 74 for communication, serve to transmit seat force, front and rear derailleur operator commands, wind speed, and forward and vertical accelerations respectively to control panel 120 intercepted through BLE transceiver 71 for data processing thereof through application program (APP) 62.

Relying on wireless Bluetooth Low Energy (BLE) transceiver 75 serving to relay front derailleur position and receive front derailleur position commands from control panel 120, front derailleur 114 additionally comprises battery 76 serving to provide power and digital magnetic rotary encoder 77 serving to relay actual derailleur position to comparator/resolver 78 used to compare actual derailleur position thereof to desired derailleur position received from control panel 120, and accordingly bias motor driver 79 serving to power electrical motor 80 of front derailleur 114. The first alternate embodiment of the front derailleur with integral cadence sensor 114 of the present invention additionally embodies cadence sensor 17 serving to additionally relay pedaling motion to control panel 120 with transmission thereof taking place through BLE transceiver 75 of front derailleur 114 to BLE transceiver 71 of control panel 120.

Relying on wireless Bluetooth Low Energy (BLE) transceiver 81 serving to relay rear derailleur position and receive rear derailleur position commands from control panel 120, rear derailleur 110 additionally comprises battery 82 serving to provide power and digital magnetic encoder 83 serving to relay actual derailleur position to comparator/resolver 84 used to compare actual derailleur position thereof to desired derailleur position received from control panel 120, and accordingly bias motor driver 85 serving to power electrical motor 86 of rear derailleur 110.

Figure 9:
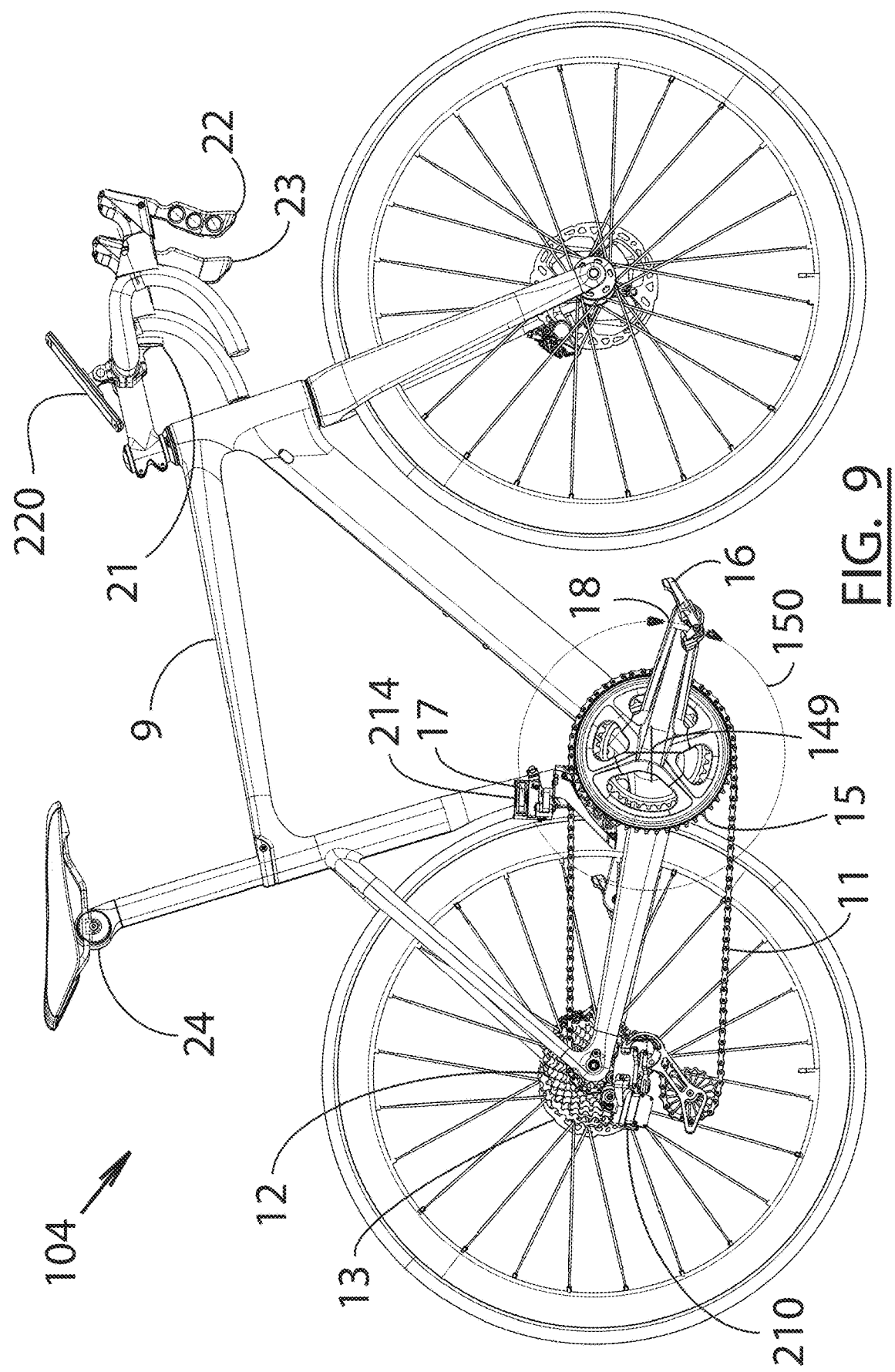
FIG. 9 is an overall view of the mechanical and electrical components of a bicycle making use of the second alternate embodiment of the front derailleur with integral cadence sensor of the present invention.
Figure 10:
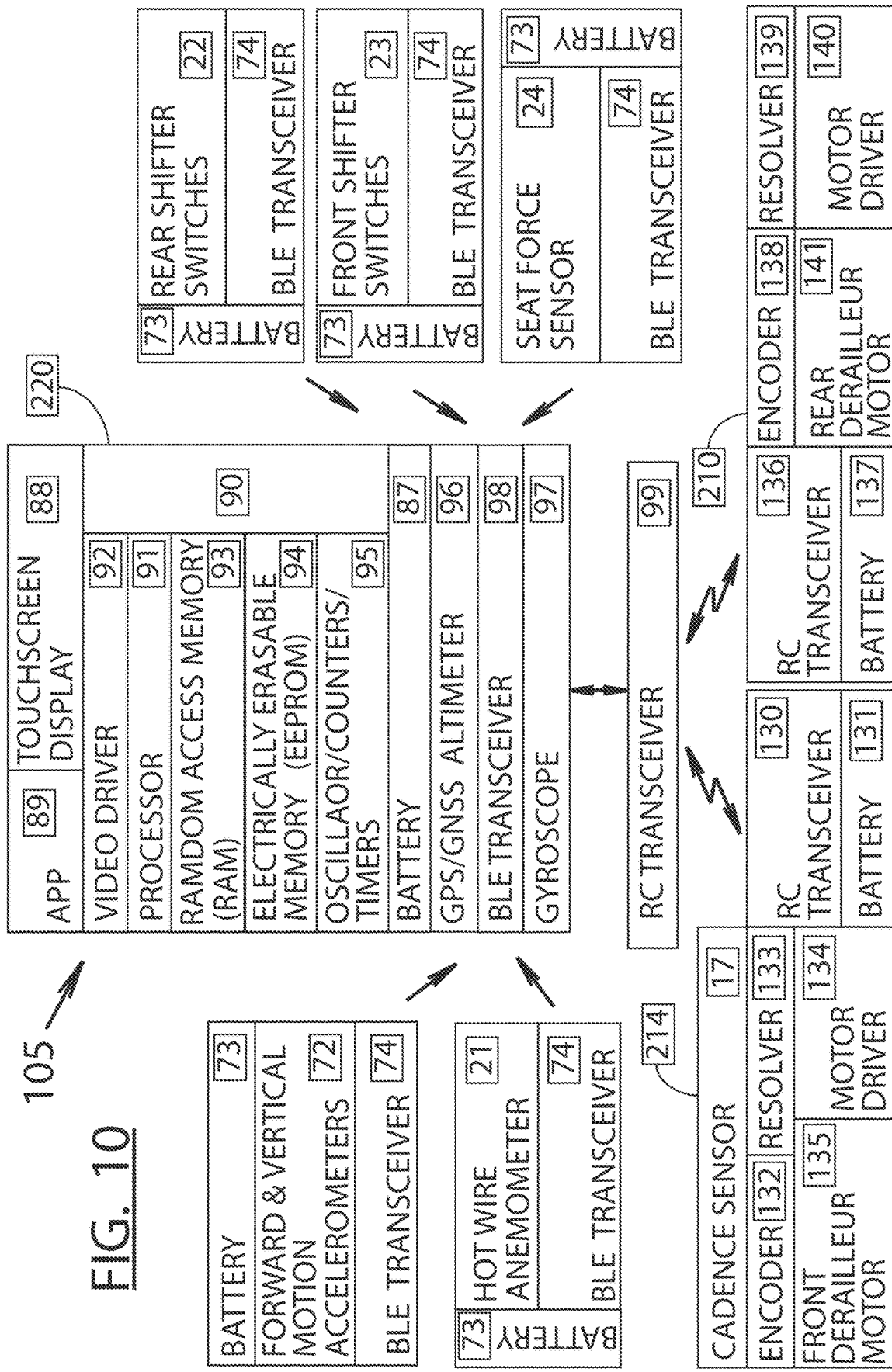
FIG. 10 is a block diagram of a comprehensive control system for a bicycle making use of the second alternate embodiment of the front derailleur with integral cadence sensor of the present invention.
Figures 13A, 13B:
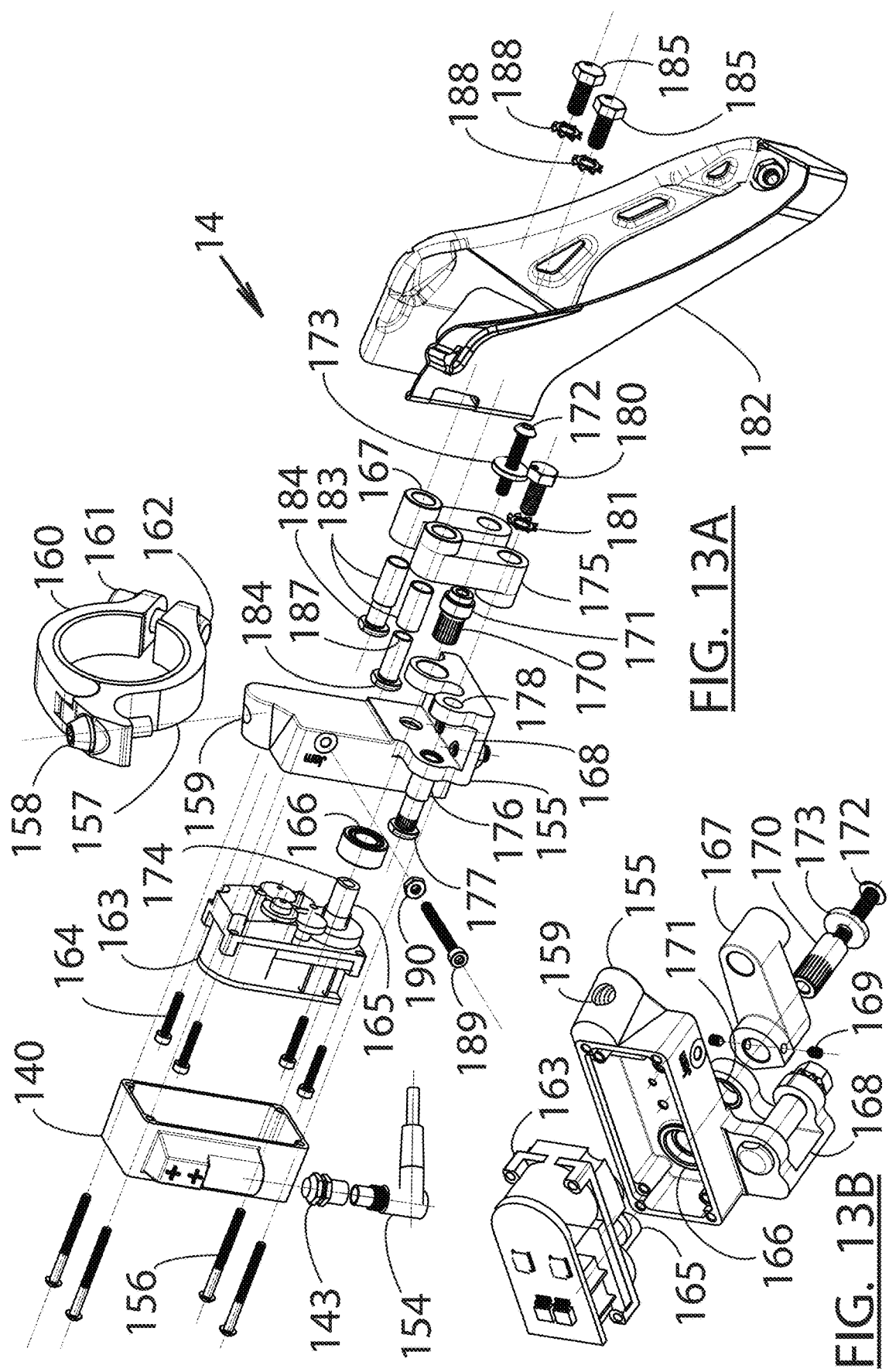
FIG. 13A is an exploded bottom view of the preferred embodiment of the front derailleur with integral cadence sensor of the present invention.
FIG. 13B is an exploded top view of the actuation components of the preferred embodiment of the front derailleur with integral cadence sensor of the present invention.

Second Alternate Embodiment Construction—FIGS. 9 & 10.

With reference to FIGS. 9 & 10, the second alternate embodiment 104 of a bicycle making use of making use of the second alternate embodiment of the front derailleur with integral cadence sensor of the present invention comprises rear derailleur 210 serving to alternate chain 11 between sprockets 12 of rear drive hub assembly 13, front derailleur 214 serving to alternate chain 11 between chain rings 15 rotationally affixed to front pedals assembly 16, control panel 220, vane anemometer 21, rear shifter switches 22, front shifter switches 23, seat force sensor 24, and cadence sensor 17 integral to front derailleur 214.

Second Alternate Embodiment Controls—FIGS. 9 & 10.

With reference to FIGS. 9 & 10 again, the second alternate embodiment 104 of a bicycle making use of the second alternate embodiment of the front derailleur with integral cadence sensor of the present invention makes use of controls block diagram 105 comprising the following subsystems.

Control panel 220 acting as a central wireless system controller powered by battery 87, displaying system status and receiving operator commands through touchscreen display 88 based on application program (APP) 89 executing on microcontroller subsection 90 including processor 91, video driver 92, random access memory (RAM) 93, electrically erasable programmable read only memory (EEPROM) 94, oscillator/counters/timers subsection 95 based on signals received from integral GPS/GNSS altimeter 96, gyroscope 97 and through Bluetooth Low Energy (BLE) transceiver 98 wireless signals received from seat force sensor 24, front shifter switches 23, rear shifter switches 22 vane anemometer 21, and forward and vertical motion accelerometers 72, along with signal from cadence sensor 17 integral to front derailleur 214 communicating thereto through standard wireless remote control (RC) servo transceiver 99, serves to wirelessly command each of wireless battery powered and RC receiver equipped front derailleur 214 and wireless battery powered and RC receiver equipped rear derailleur 210 through standard wireless remote control (RC) servo transceiver 99.

Operating as individually powered standard Bluetooth Low Energy (BLE) spectrum protocol discrete transmission units, seat force sensor 24, front shifter switches 23, rear shifter switches 22, vane anemometer 21, and forward and vertical motion accelerometers 72, each comprising own battery 73 for power and own Bluetooth Low Energy (BLE) transceiver 74 for communication, serve to transmit seat force, front and rear derailleur operator commands, wind speed, and forward and vertical accelerations respectively to control panel 220 intercepted through BLE transceiver 98 for data processing thereof by (APP) 89.

Relying on standard wireless remote control (RC) servo transceiver 130 serving to receive derailleur position commands from control panel 220 sent through RC transceiver 99, front derailleur 214 additionally comprises battery 131 serving to provide power and digital magnetic encoder 132 serving to relay actual derailleur position to comparator/resolver 133 used to compare actual derailleur position thereof to desired derailleur position received from control panel 220, and accordingly bias motor driver 134 serving to power electrical motor 135 of front derailleur 214. The second alternate embodiment of the front derailleur with integral cadence sensor 214 of the present invention additionally embodies cadence sensor 17 serving to additionally relay pedaling motion thereof to control panel 220 with transmission thereof taking place through RC servo transceiver 130 of front derailleur 214 through RC transceiver 99 to control panel 220.

Relying on standard wireless remote control (RC) servo transceiver 136 serving to receive derailleur position commands from control panel 220 sent through RC transceiver 99, rear derailleur 210 additionally comprises battery 137 serving to provide power and digital magnetic encoder 138 serving to relay actual derailleur position to comparator/resolver 139 used to compare actual derailleur position thereof to desired derailleur position received from control panel 220, and accordingly bias motor driver 140 serving to power electrical motor 141 of rear derailleur 210.

Front Derailleur Construction—FIGS. 11A, 11B, 12A, 12B, 13A, 14A, 13B and 14B.

With reference to frontal, rearward, extended, contracted, exploded and partial isometric views depicted in FIGS. 11A, 11B, 12A, 12B, 13A, 14A, 13B & 14B respectively, the preferred embodiment front derailleur with integral cadence sensor 14 of the present invention comprises connector 154 serving to deliver power, derailleur control signal 53 as well as cadence sensor 17 feedback signal 30 of front derailleur 14 through receptacle 143 permanently affixed to tapped hole 142 of trailing side of cover lateral extension 141 of cover 140 which is in turn secured to derailleur housing 155 by screws 156 and with derailleur housing 155 in turn secured to bicycle frame 9 by mounting bracket 157 and retained thereto by screw 158 extending through mounting bracket 157 and torqued into tapped hole 159 of derailleur housing 155 with hinged collar 160 serving to secure mounting bracket 157 to bicycle frame 9 by bolt 161 through engagement of nut 162 for affixed retention of front derailleur 14 to bicycle frame 9, (RC) servo drive unit 163 secured to derailleur housing 155 by screws 164 with power shaft 165 thereof extending through roller bearing 166 press fit into derailleur housing 155, and extending through derailleur housing 155 and into power link 167 retained in double shear in cavity 168 of derailleur housing 155 and secured to power shaft 165 by setscrews 169 with additional retention of power link 167 to power shaft 165 provided by knurled shaft 170 extending through bushing 171 press fit into flange in opposite end of derailleur housing 155 and secured to power shaft 165 by screw 172 acting against washer 173 for retention thereof by tightening into tapped hole 174 of power shaft 165, idler link 175 with thereto press fit bushing 176 pivotally operable in cavity 168 of derailleur housing 155 about retaining bolt 177 knurled on one side and tapped on the other and extending through dual inline bores 178 of lateral extension 179 of derailleur housing 155 with retaining bolt 177 secured thereof in the axial direction by hex bolt 180 and lockwasher 181, chain guide 182 pivotally operable in opposite ends of power link 167 and idler link 175 along with thereto press fit bushings 183 about pivot bolts 184 permanently affixed to chain guide 182 from the opposite ends by bolts 185 extending through bores 186 of chain guide 182 and into tapped holes 187 in pivot bolts 184 and retained thereto by lockwashers 188, lateral jam bolt 189 locked in position by locknut 190 and extending fully through tapped bore in derailleur housing 155 to mating contact point of mounting bracket 157 in order to exert a side load thereof on mounting bolt 158 for additional secured retention of derailleur housing to mounting bracket 157.

Front Derailleur End Stops—FIGS. 14C & 14D.

With reference to sectional views depicted in FIGS. 14C & 14D respectively, the preferred embodiment front derailleur with integral cadence sensor 14 of the present invention additionally includes inward end stop setscrew 191 extending through tapped hole 192 in derailleur housing 155 for action thereof against idler link 175 and secured thereto by locknut 193 against derailleur housing 155 and outward end stop setscrew 194 extending through tapped bore 195 of derailleur housing 155 for action thereof against power link 167 and secured thereto by locknut 196 against derailleur housing 155.

Front Derailleur Drive Assembly Construction—FIGS. 15A, 15B, 16A-16C.

With reference to FIGS. 15A, 15B, 16A-16C, the preferred embodiment servo drive unit 163 of front derailleur with integral cadence sensor 14 of the present invention comprises drive motor 51 press fit into bore 250 of base plate 251 secured to derailleur housing 155 by screws 164 through mounting holes 252, with powering terminals thereof soldered directly onto output traces of servo electronics board 253, and with output shaft 254 thereof extending through slip fit bore 255 of base plate 251 and press fit into pinion 256 engaging first stage driven gear 257 centrally affixed to smaller second stage driver gear 258 rotationally supported by axle 259 with slip fit extension thereof through both gears and a press fit into bore 260 of base plate 251, second stage driver gear 258 engaging second stage driven gear 261 concentric to thereto affixed smaller third stage driver gear 262 centrally supported by axle 263 with slip fit extension thereof through both gears and a press fit into bore 264 of base plate 251, third stage driver gear 262 engaging third stage driven gear 265 concentric to thereto affixed smaller fourth stage driver gear 266 centrally supported by axle 267 with slip fit extension thereof through both gears and a press fit into bore 268 of base plate 251, fourth stage driver gear 266 engaging fifth stage driven gear 269 concentric to thereto affixed smaller fifth stage driver gear 270 centrally supported by axle 271 with slip fit extension thereof through both gears and a press fit into bore 272 of base plate 251, fifth stage driver gear 270 engaging integral gear 273 of power shaft 165 including bore 274 for centrally supporting by press fit bearing 275 with internal diameter thereof press fit into cylindrical forward protrusion 276 of base plate 251, servo encoder shaft 277 rotationally operable in concentric slip fit bore 278 of cylindrical protrusion 276 of base plate 251 and including flats 279 precision fit into slot 280 of servo power shaft 165 with opposite end thereof including concentric boss 281 with concentric bore 282 housing thereto precision fit and bonded cylindrical magnet 283, rearward extension 284 of base plate 251 serving to accurately position rotation magnetic sensor 285 permanently secured to circuit board 286 in turn secured in proper relation to magnet 283 of rearward extension 284 by screws 287, and with electrical terminals 288 serving to provide position feedback of servo encoder shaft 277 and consequentially that of thereto rotationally affixed power shaft 165 to servo electronic board 253.

Front Derailleur Actuation—FIGS. 12A, 12B, 13A, 13B, 14A-14D.

With reference to FIGS. 12A, 12B, 13A, 13B, 14A-14D again, actuation of the preferred embodiment front derailleur with integral cadence sensor 14 of the present invention with position capability thereof anywhere between extreme extended position depicted in FIG. 12A and extreme retracted position depicted in FIG. 12B is achieved through actuation of the servo drive unit 163 through rotation of power shaft 165 rotationally affixed to power link 167 at one end with opposite end thereof pivotally secured to chain guide 182 by respective pivot bolt 184 and with idler link 175 of predominantly equal length pivotally secured to front derailleur housing 155 by retaining bolt 177 and to chain guide 182 at opposite end by respective pivot bolt 184. Sheer lateral translation of chain guide 182 is ensured through equal lateral angular displacements of power link 167 about center of power shaft 165 to that of idler link 175 about center of retaining bolt 177, and with distance of center of power shaft 165 to that of retaining bolt 177 in derailleur housing 155 predominantly equal to distance between bores 186 in chain guide 182, a four bar mechanism configuration with equal lengths opposing members is achieved resulting in equal rotation of rotating members power link 167 and idler link 175 and sheer translation of thereof translating member chain guide 182, with no rotation. Moreover, with position of front derailleur 14 directly related to rotation of power shaft 165 and consequentially to thereto rotationally secured servo encoder shaft 277 and magnet 283 relative to thereof fixed servo encoder sensor 285, signal of encoder sensor 285 relayed through terminals 288 to electronics board 253 for processing corresponding to position of power shaft 165 is consequentially that of exact position of front derailleur 14.

Front Derailleur Position Feedback—FIGS. 15A, 15B, 16A-16C.

With reference to FIGS. 15A, 15B, 16A-16C again, the preferred embodiment of front derailleur with integral cadence sensor 14 of the present invention making use of servo drive unit 163 embodies the recently commercially available digital magnetic encoder comprising a magnetic sensor chip with a digitally encoded output proportionate to orientation of overhead flux a standard bipolar magnet. With application thereof readily available in standard wireless remote control (RC) servo assembly implemented in this construction, the preferred embodiment front derailleur servo drive unit 163 comprises rearward extension 284 of base plate 251 serving as mount for magnetic encoder board 286 with properly positioned rotation magnetic sensor 285 by screws 287, and thereto properly positioned cylindrical magnet 283 disposed in concentric bore 282 of boss 281 of servo encoder shaft 277 rotationally operable in bore 278 of cylindrical protrusion 276 of base plate 251 and with flats 279 thereof rotationally retained into closely matching slot 280 in base of bore 274 of gear 273 in opposite end of power shaft 165 for direct sensing of rotational position thereof. With power shaft 165 of remote control (RC) servo assembly permanently secured to mechanism of front derailleur 14 through power link 167, any given rotation of power shaft 165 directly result in a repeatable position of front derailleur 14 and in turn thereof relayed signal from encoder sensor 285 consequentially directly corresponds to position of front derailleur 14.

For improved rotational position accuracy sensing of power shaft 165 and consequentially that of front derailleur 14, flats 279 of servo encoder shaft 277 are typically potted into receiving matching slot 280 of gear 273 of power shaft 165 so that cylindrical magnet 283 is rotationally locked to power shaft 165 and thereby resultant readings of encoder board 286 directly correspond to position of power shaft 165 and consequentially that of front derailleur 14.

Front Derailleur without Cadence Sensing—FIGS. 17A & 17B.

With reference to FIGS. 17A & 17B, the third alternate embodiment of the front derailleur 314 of the present invention entails removal of all cadence sensing components and provisions from the preferred embodiment front derailleur with integral cadence sensor 14 to result in a standard front derailleur with no cadence sensing. With reference to FIG. 17A cover 340 comprising sideward extension 341 including bore 142 machined into trailing end thereof and tapped for receipt of receptacle 343 with connections thereof limited to those for servo drive unit 163, the third alternate embodiment 314 of the front derailleur without cadence sensor is defined for rare applications not requiring cadence sensing by the front derailleur with application thereof including chain movement sensing by other means as well as applications not relying on chain movement sensing altogether With reference to exploded perspective view depicted in FIG. 17B, the third alternate embodiment front derailleur 314 of the present invention comprises connector 354 serving to deliver power and derailleur control signal 53 of front derailleur 314 through receptacle 343 permanently affixed to tapped hole 142 of trailing side of cover lateral extension 341 of cover 340 which is in turn secured to derailleur housing 155 by screws 156 and with derailleur housing 155 in turn secured to bicycle frame 9 by mounting bracket 157 and retained thereto by screw 158 extending through mounting bracket 157 and torqued into tapped hole 159 of derailleur housing 155 with hinged collar 160 serving to secure mounting bracket 157 to bicycle frame 9 by bolt 161 through engagement of nut 162 for affixed retention of front derailleur 314 to bicycle frame 9, (RC) servo drive unit 163 secured to derailleur housing 155 by screws 164 with power shaft 165 thereof extending through roller bearing 166 press fit into derailleur housing 155, and extending through derailleur housing 155 and into power link 167 retained in double shear in cavity 168 of derailleur housing 155 and secured to power shaft 165 by setscrews 169 with additional retention of power link 167 to power shaft 165 provided by knurled shaft 170 extending through bushing 171 press fit into flange in opposite end of derailleur housing 155 and secured to power shaft 165 by screw 172 acting against washer 173 for retention thereof by tightening into tapped hole 174 of power shaft 165, idler link 175 with thereto press fit bushing 176 pivotally operable in cavity 168 of derailleur housing 155 about retaining bolt 177 knurled on one side and tapped on the other and extending through dual inline bores 178 of lateral extension 179 of derailleur housing 155 with retaining bolt 177 secured thereof in the axial direction by hex bolt 180 and lockwasher 181, chain guide 182 pivotally operable in opposite ends of power link 167 and idler link 175 along with thereto press fit bushings 183 about pivot bolts 184 permanently affixed to chain guide 182 from the opposite ends by bolts 185 extending through bores 186 of chain guide 182 and into tapped holes 187 in pivot bolts 184 and retained thereto by lockwashers 188, lateral jam bolt 189 locked in position by locknut 190 and extending fully through tapped bore in derailleur housing 155 to mating contact point of mounting bracket 157 in order to exert a side load thereof on mounting bolt 158 for additional secured retention of derailleur housing to mounting bracket 157.

Operation of Front Derailleur without Cadence Sensing—FIGS. 17A & 17B.

With reference to FIGS. 17A & 17B again, operation of the third alternate embodiment of the front derailleur 314 of the present invention is achieved through actuation of the servo drive unit 163 through rotation of power shaft 165 rotationally affixed to power link 167 at one end with opposite end thereof pivotally secured to chain guide 182 by respective pivot bolt 184 and with idler link 175 of predominantly equal length pivotally secured to front derailleur housing 155 by retaining bolt 177 and to chain guide 182 at opposite end by respective pivot bolt 184. Sheer lateral translation of chain guide 182 is ensured through equal lateral angular displacements of power link 167 about center of power shaft 165 to that of idler link 175 about center of retaining bolt 177, and with distance of center of power shaft 165 to that of retaining bolt 177 in derailleur housing 155 predominantly equal to distance between bores 186 in chain guide 182, a four bar mechanism configuration with equal lengths opposing members is achieved resulting in equal rotation of rotating members power link 167 and idler link 175 and sheer translation of thereof translating member chain guide 182, with no rotation. Moreover, with position of front derailleur 314 directly related to rotation of power shaft 165 and consequentially to thereto rotationally secured servo encoder shaft 277 and magnet 283 relative to thereof fixed servo encoder sensor 285, signal of encoder sensor 285 relayed through terminals 288 to electronics board 253 for processing corresponding to position of power shaft 165 is consequentially that of exact position of front derailleur 314.

Figure 18C:
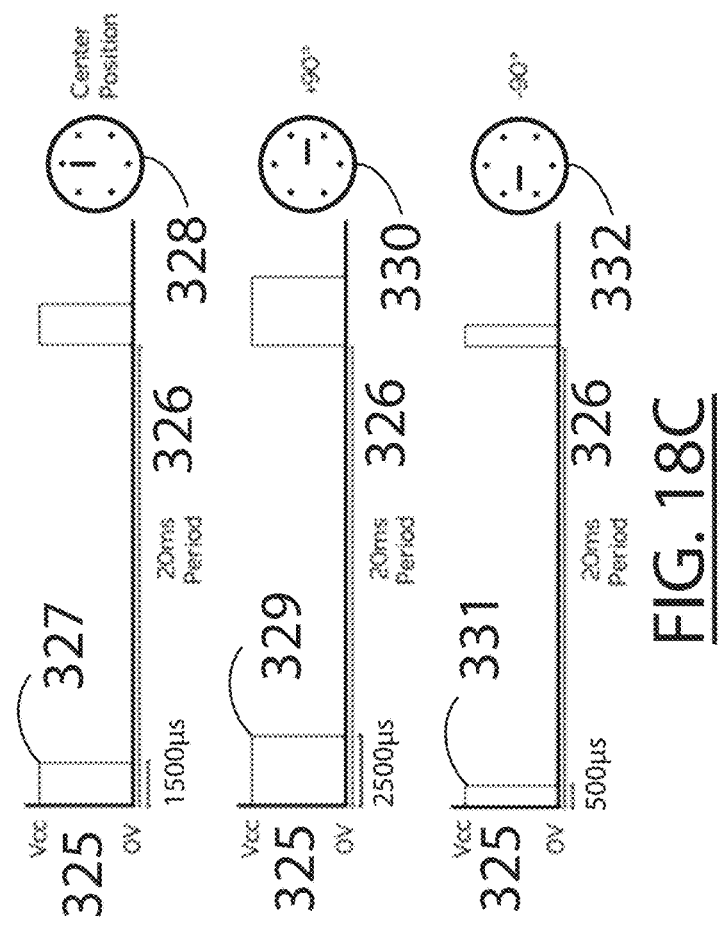
FIG. 18C is a chart depicting pulse width modulation (PWM) control of the wireless remote control (RC) servo drive unit made use of by the preferred and alternate embodiments of the front derailleur with integral cadence sensor of the present invention.
Figure 18B:
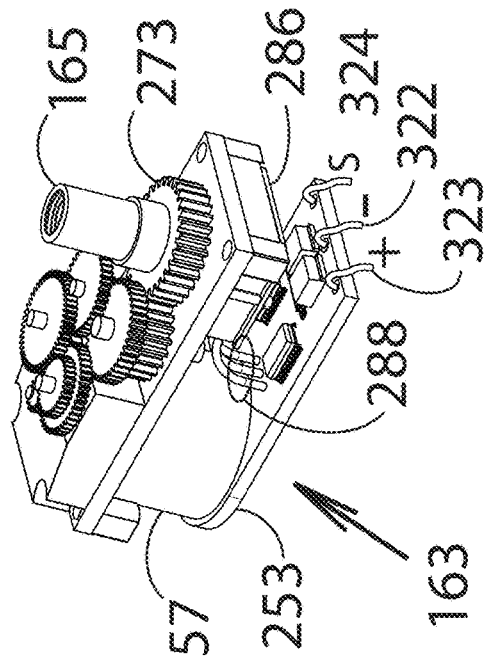
FIG. 18B is a dimetric assembly view of the wireless remote control (RC) servo drive unit made use of by the preferred and alternate embodiments of the front derailleur with integral cadence sensor of the present invention further depicting position feedback, power supply and actuation signal wiring.
Figure 18A:
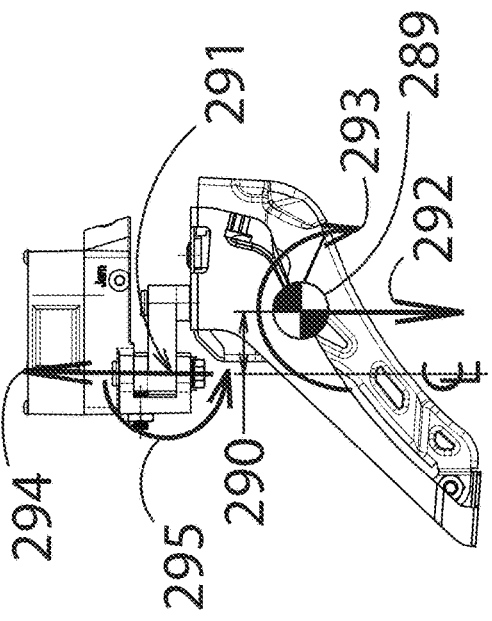
FIG. 18A is side view of the preferred and alternate embodiments of the front derailleur with integral cadence sensor of the present invention additionally depicting gravitational and vertical inertial forces and resultant moments.

Front Derailleur Immunity to Gravity—FIG. 18A.

With reference to force diagram depicted in FIG. 18A, the preferred embodiment of the front derailleur with integral cadence sensor 14 of the present invention, through devising action of moving members in the horizontal direction bears immunity to gravitational and inertial forces in the vertical direction as demonstrated through analysis of gravitational and in case of vertical shock additional inertial forces acting on moving members in the vertical direction, chain guide 182, power link 167, idler link 175, pivot bolts 184, press fit bushings 183, retaining bolts 185 and lockwashers 188, whose collective centroid 289 acting through distance 290 from center lines of pivoting action 291 of power link 167 and idler link 175 results in downward force 292 equal to collective mass of thereof enumerated components multiplied by the gravitational constant as well as a clockwise, as depicted in FIG. 18A, moment 293 equal to force 292 multiplied by distance 290 in turn reacted by vertical upward reaction 294 and counterclockwise moment 295 along center line of pivoting action 291 of power shaft 165 and retaining bolt 175 retaining power link 167 and idler link 175 respectively.

With force 294 and moment 295 acting in a plane removed by 90 degrees from plane of rotation of power shaft 165, it should be abundantly clear to a person skilled in the art that the net effect of horizontal alignment of moving members of front derailleur 14 amounts to no more than a retarding reactions in the actuation joints with likely minor effects on the response time of the mechanism of front derailleur 14 due to induced frictional losses but bearing no effect on positioning ability of servo drive unit 163 to properly position front derailleur 14 as these reactions do not result in an effort consistent with reverse actuation or backwinding effect thereof.

It is also noteworthy to state that the mass of these same aforementioned moving components of front derailleur 14 is suspect to horizontal inertial forces with action thereof aligned to actuation action of front derailleur 14. However, given that horizontal inertial forces due to for example swinging, cornering etc. acting on moving members of front derailleur 14 are on a much lower order than vertical inertial forces, as for example cycling into bumps or potholes which typically produce inertial forces on a substantial magnitude, thereby bearing minimal effect on position of front derailleur 14, they can be ignored altogether.

Front Derailleur Position Feedback—FIGS. 18B & 18C.

With reference to FIGS. 18B & 18C, the preferred embodiment of the front derailleur with integral cadence sensor 14 of the present invention bears an actuation position in direct and linear relation to that of servo drive unit 163 through closed loop feedback control of servo electronics board 253 facilitated by connection of electrical terminals 288 of digital magnetic encoder board 286 serving to relay position of power shaft 165 and consequently that of thereto retained front derailleur 14.

Additionally, servo drive unit 163 implemented in the preferred embodiment of front derailleur with integral cadence sensor 14 of the present invention makes use of among many available wireless remote control (RC) servo protocols, that of pulse width modulation (PWM) typically in the 50 hertz (HZ) range with pulse width typically ranging from 500 microseconds to 2500 microseconds thereof being directly linearly proportional to position of servo output shaft 165 and consequentially that of front derailleur 14.

With the sole connection to servo electronics board 253 being three wires with power being supplied by negative wire 322 and positive wire 323, and with the third wire 324 delivering front derailleur control signal 53 with voltage 325 thereof charted in FIG. 18C with a nominal value Vcc on the ordinate vs. time 326 on the abscissa at a typical actuation frequency of around 50 hertz (HZ), a signal with pulse width 327 of 1500 microseconds at nominal control voltage Vcc results in servo unit 163 movement to center position of power shaft 165 as depicted in dial 328 in FIG. 18C, a signal with pulse width 329 of 2500 microseconds at nominal control voltage Vcc results in servo unit 163 movement to extreme clockwise position of power shaft 165 as depicted in dial 330 in FIG. 18C, and last a signal with pulse width 331 of 500 microseconds at nominal control voltage Vcc results in servo unit 163 movement to extreme counterclockwise position of power shaft 165 as depicted in dial 332 in FIG. 18C.

Needing not be emphasized is that these relations are for reference only and that a direct and linear relationship exists between value of pulse width signal 53 of control signal wire 324 in microseconds to command position of servo drive unit 163 and consequentially that of front derailleur 14.

The invention claimed is:

1. A front derailleur with an integral cadence sensor comprising,
   a) a housing including a closed cavity with a through bore and a sideward extension,
   b) said housing further including an open cavity with a bifurcating extension on opposite end of said closed cavity with orientation thereof in the horizontal direction,
   c) a servo drive unit disposed in said closed cavity with output shaft thereof extending through said through bore,
   d) a driver link pivotally operable in the horizontal direction in said open cavity through affixation of one end thereof to said output shaft,
   e) an idler link of predominantly equal proportions to said driver link pivotally operable in the horizontal direction in said open cavity through a fixed support shaft extending through said sideward extension, through one end of said idler line, through said open cavity,
   f) a chain guide including two shafts pivotally secured to opposite ends of said driver link and said idler link on a predominantly equal spacing to distance between said output shaft and said fixed support shaft,
   g) a closure cover for said closed cavity including a lateral extension with a tapped bore seating a multi-prong receptacle on one end and a through bore housing a magnet presence sensor on the opposite end,
   h) a cadence magnet affixed to inside of a bicycle pedals at an equal radial distance from pivot of said bicycle pedals to that of said magnet presence sensor with positioning in the lateral direction thereof in the immediate vicinity, and
   i) said multi-prong receptacle including connections for power and control signals for said servo drive unit and said magnet presence sensor,
   whereby upon receiving a powering voltage and a new control signal through said multi-prong receptacle and upon said magnet presence sensor excitation by said cadence magnet thereby ensuring necessary chain movement presence for a shift operation of said front derailleur, said servo drive unit forces controlled rotation of said output shaft thereby forcing equivalent rotation of thereto affixed said driver link with equivalent rotation of said idler link forcing pure translation of said thereto pivotally secured chain guide to a new position thereof satisfying said new control signal with orientation of said driver link and said idler link in the horizontal direction thereof preventing transmission of any reverse actuation efforts stemming from vertical reactions and inertial forces to said servo drive unit thereby ensuring precise and consistent final positioning of said front derailleur.

2. The front derailleur with an integral cadence sensor of claim 1 wherein said magnet presence sensor comprises one hall effect sensor.

3. The front derailleur with an integral cadence sensor of claim 1 wherein said magnet presence sensor comprises two hall effect sensors.

4. The front derailleur with an integral cadence sensor of claim 1 wherein said servo drive unit includes a magnetic encoder with a direct connection to said output shaft.

5. The front derailleur with an integral cadence sensor of claim 1 wherein said servo drive unit includes a potentiometer with a direct connection to said output shaft.

6. The front derailleur with an integral cadence sensor of claim 1 wherein said servo drive unit employs a five-stage spur gearing reduction.

7. The front derailleur with an integral cadence sensor of claim 1 further including a battery, a Bluetooth receiver, a servo position encoder and a servo drive electronics.

8. The front derailleur with an integral cadence sensor of claim 1 further including a battery, a standard radio control (RC) receiver, a servo position encoder and a servo drive electronics.

9. The front derailleur with an integral cadence sensor of claim 1 wherein said control signal is modulated with a pulse width varying between 500 and 2500 microseconds.

10. The front derailleur with an integral cadence sensor of claim 1 wherein said powering voltage is between 5 volts and 10 volts.

11. A front derailleur with an integral cadence sensor comprising,
   a) a housing including a closed cavity for a spur gearing reduction unit and an open cavity with a bifurcating extension,
   b) a cover for said closed cavity with a sideward extension thereof including a magnetic presence sensor,
   c) a cadence magnet permanently affixed to inside of a bicycle pedals in the vicinity of said magnetic presence sensor,
   d) said spur gearing reduction unit with an output shaft penetrating said closed cavity and rotationally affixed to one end of a front derailleur actuation link pivotally operable in said bifurcating extension of said open cavity,
   e) a front derailleur idler link of predominantly equal proportions to said front derailleur actuation link with one end thereof pivotally operable in said bifurcating extension of said open cavity,
   f) a front derailleur chain guide with two shafts pivotally secured to free ends of said front derailleur actuation link and said front derailleur idler link on a predominantly equal spacing to opposite ends thereof,
   g) said spur gearing reduction unit further including an electric motor and a magnetic rotary encoder with a position magnet thereof permanently affixed to said output shaft,
   h) said spur gearing reduction unit further including a comparator electronics assembly with a motor amplifier connected to said electric motor, and
   i) said comparator electronics assembly further including a position feedback input terminal for said magnetic rotary encoder, a negative input power terminal, a positive input power terminal and a signal input terminal for a pulse width modulated signal with a predefined relation to said output shaft,
   whereby upon said comparator electronics assembly receiving said pulse width modulation signal and upon excitation of said magnetic presence sensor by said cadence magnet, said comparator electronics assembly applies a powering voltage differential across said positive input power terminal and said negative input power terminal and applies said pulse width modulation signal to said signal input terminal thereby biasing said motor amplifier and actuating said electric motor thereby forcing rotation of said output shaft through said spur gearing reduction unit to a new balancing position of thereto affixed servo position magnet in relation to said magnetic rotary encoder with signal thereof received through said position feedback input terminal in turn forcing rotation of thereto affixed said front derailleur actuation link with equivalent rotation of said front derailleur idler link forcing pure translation of thereto pivotally secured said front derailleur chain guide to a new position thereof satisfying said pulse width modulation signal.

12. The front derailleur with an integral cadence sensor of claim 11 wherein said electric motor is a brushed dc motor.

13. The front derailleur with an integral cadence sensor of claim 11 wherein said electric motor is a brushed coreless dc motor.

14. The front derailleur with an integral cadence sensor of claim 11 wherein said electric motor is a brushless ac motor and said motor amplifier further including a motor commutation electronics.

15. The front derailleur with an integral cadence sensor of claim 11 wherein said magnetic presence sensor comprises one hall effect sensor.

16. The front derailleur with an integral cadence sensor of claim 11 wherein said magnetic presence sensor comprises two hall effect sensors.

17. The front derailleur with an integral cadence sensor of claim 11 wherein said spur gearing reduction unit makes use of quadruple spur gearing reduction.

18. A process for controlled actuation of a bicycle front derailleur with an integral cadence sensor comprising,
   a) providing a bicycle front derailleur with a housing including a closed cavity for a wireless remote control (RC) servo drive unit and an open cavity with a horizontal bifurcating extension,
   b) providing said wireless remote control (RC) servo drive unit with an output shaft rotationally affixed to a driver link horizontally rotatable in said bifurcating extension of said open cavity,
   c) providing said open cavity with a horizontally rotatable idler link of predominantly equal proportions to said driver link,
   d) providing said bicycle front derailleur with a chain guide pivotally secured to free ends of said driver link and said idler link at a predominantly equal distance to opposite ends thereof,
   e) providing said housing with a cover for said closed cavity with a lateral extension including a magnetic cadence sensor,
   f) providing said bicycle with a cadence magnet affixed to inside of a bicycle pedals in vicinity of said magnetic cadence sensor,
   g) providing said wireless remote control (RC) servo drive unit with an electric motor and a magnetic rotary encoder with position magnet thereof affixed to said output shaft,
   h) providing said wireless remote control (RC) servo drive unit with an integral comparator electronics assembly including a motor amplifier connected to said electric motor, and
   i) providing said comparator electronics assembly with a servo position input terminal for said magnetic rotary encoder, a negative input power terminal, a positive input power terminal and a servo signal input terminal for a pulse width modulation signal with a predefined relation to position of said wireless remote control (RC) servo drive unit,
   whereby upon said comparator electronics assembly receiving a powering voltage differential across said negative input power terminal and said positive input power terminal and said pulse width modulation signal through said servo signal input terminal and upon excitation of said magnetic cadence sensor by said cadence magnet, said comparator electronics assembly compares said width modulation signal to position of said wireless remote control (RC) servo drive unit through monitoring of signal received through said servo position input terminal and accordingly biases said motor amplifier thereby actuating said electric motor to a balancing position of said remote control (RC) servo drive unit thereof resulting in controlled rotation of said output shaft and thereto secured said driver link with equivalent rotation of said idler link forcing pure translation of said chain guide of said bicycle front derailleur to a new position satisfying said pulse width modulation signal with horizontal position of said driver link and said idler link preventing transmission of any vertical inertial forces and reactions thereof to said remote control (RC) servo drive unit.

19. The process for controlled actuation of a bicycle front derailleur with an integral cadence sensor of claim 18 wherein said cadence magnetic sensor makes use of one hall effect sensor.

20. The process for controlled actuation of a bicycle front derailleur with an integral cadence sensor of claim 18 wherein said cadence magnetic sensor makes use of two hall effect sensors.

21. A front derailleur comprising,
   a) a housing including a closed cavity with a through bore and a sideward extension,
   b) said housing further including an open cavity with a bifurcating extension on opposite end of said closed cavity with orientation thereof in the horizontal direction,
   c) a servo drive unit disposed in said closed cavity with output shaft thereof extending through said through bore,
   d) a driver link pivotally operable in the horizontal direction in said open cavity through affixation of one end thereof to said output shaft,
   e) an idler link of predominantly equal proportions to said driver link pivotally operable in the horizontal direction in said open cavity through a fixed support shaft extending through said sideward extension, through one end of said idler line, through said open cavity,
   f) a chain guide including two shafts pivotally secured to opposite ends of said driver link and said idler link on a predominantly equal spacing to distance between said output shaft and said fixed support shaft,
   g) a closure cover for said closed cavity including a lateral extension with a tapped bore seating a multi-prong receptacle, and
   h) said multi-prong receptacle including connections for power and control signals for said servo drive unit,
   whereby upon receiving a powering voltage and a new control signal through said multi-prong receptacle, said servo drive unit forces controlled rotation of said output shaft thereby forcing equivalent rotation of thereto affixed said driver link with equivalent rotation of said idler link forcing pure translation of said thereto pivotally secured chain guide to a new position thereof satisfying said new control signal with orientation of said driver link and said idler link in the horizontal direction thereof preventing transmission of any reverse actuation efforts stemming from vertical reactions and inertial forces to said servo drive unit thereby ensuring precise and consistent final positioning of said front derailleur.

* * * * *